(12) United States Patent
Rune et al.

(10) Patent No.: US 8,391,238 B2
(45) Date of Patent: Mar. 5, 2013

(54) AUTOMATIC CONFIGURATION OF INTER-DOMAIN ACCESS TECHNOLOGY NEIGHBOR RELATIONS

(75) Inventors: Johan Rune, Lidingo (SE); Joachim Sachs, Aachen (DE)

(73) Assignee: Telefonaktiebolaget LM Ericsson (pulb), Stockholm (SE)

( * ) Notice: Subject to any disclaimer, the term of this patent is extended or adjusted under 35 U.S.C. 154(b) by 700 days.

(21) Appl. No.: 12/403,933

(22) Filed: Mar. 13, 2009

(65) Prior Publication Data
US 2010/0003980 A1 Jan. 7, 2010

Related U.S. Application Data

(60) Provisional application No. 61/077,572, filed on Jul. 2, 2008.

(51) Int. Cl.
*H04W 4/00* (2009.01)
(52) U.S. Cl. ....................................................... 370/331
(58) Field of Classification Search .................. 370/331, 370/332, 333
See application file for complete search history.

(56) References Cited

U.S. PATENT DOCUMENTS

| | | | |
|---|---|---|---|
| 7,660,319 B2* | 2/2010 | Kobayashi et al. | 370/406 |
| 7,826,847 B1* | 11/2010 | Roskowski et al. | 455/436 |
| 7,885,231 B2* | 2/2011 | Kim et al. | 370/331 |
| 2004/0029587 A1 | 2/2004 | Hulkkonen et al. | |
| 2004/0121781 A1 | 6/2004 | Sammarco | |
| 2005/0130655 A1* | 6/2005 | Lundh et al. | 455/434 |
| 2005/0141453 A1 | 6/2005 | Zhu | |
| 2006/0116125 A1* | 6/2006 | Buckley et al. | 455/435.1 |
| 2006/0187858 A1* | 8/2006 | Kenichi et al. | 370/254 |
| 2009/0137246 A1* | 5/2009 | Xing et al. | 455/434 |
| 2009/0170555 A1* | 7/2009 | Olvera-Hernandez et al. | 455/552.1 |
| 2009/0182883 A1 | 7/2009 | Giaretta et al. | |
| 2009/0199268 A1 | 8/2009 | Ahmavaara et al. | |
| 2009/0207812 A1 | 8/2009 | Gupta et al. | |

FOREIGN PATENT DOCUMENTS

| | | |
|---|---|---|
| WO | 2006/063309 | 6/2006 |
| WO | 2007/103975 | 9/2007 |
| WO | 2007/146406 | 12/2007 |

OTHER PUBLICATIONS

International Search Report dated Oct. 30, 2009 (4 pages).

(Continued)

*Primary Examiner* — Mark Rinehart
*Assistant Examiner* — Mohammad Anwar
(74) *Attorney, Agent, or Firm* — Nixon & Vanderhye P.C.

(57) ABSTRACT

The disclosure relates to automatically configuring a map of inter-access technology neighbor relations. In this neighbor relations map configured by an ANDSF, relationships between neighboring cells of differing access networks of the same or different access technologies are maintained including extra-domain and non-domain neighbor relationships. A domain refers to a domain of one or more access technologies in which ANDSF is not required for intra-domain access selection and discovery. ANDSF configures the map based on neighbor relations data reports from wireless terminals, which record the neighbor relations data as they perform extra-domain or non-domain handovers or reselections or as they scan their surroundings. ANDSF provides steering instructions to configure the neighbor relations data recording and reporting behaviors of the wireless terminals. ANDSF provides access network discovery and selection information, which indicates availability of non-domain accesses, and in some cases domain accesses, to wireless terminals based on their locations.

40 Claims, 13 Drawing Sheets

OTHER PUBLICATIONS

M. Siebert et al. "Hybrid Information System", Vehicular Technology Conference 2004; VTC 2004—Spring; 2004 IEEE 59th Milan, Italy, May 17-19, 2004, Piscataway, NJ; vol. 5, pp. 2982-2986, XP010766797.

International Preliminary Report on Patentability mailed Sep. 24, 2010 (57 pages).

3GPP TS 23.402 v8.1.1 (Mar. 2008), 3rd Generation Partnership Project; Technical Specification Group Services and System Aspects; Architecture enhancements for non-3GPP accesses (Release 8) (163 pages).

International Search Report and Written Opinion dated Jun. 30, 2009 (18 pages).

3GPP TS 23.402 V8.2.0, 3rd Generation Partnership Project; Technical Specification Group Services and System Aspects; Architecture enhancements for non-3GPP accesses (Release 8), Jun. 2008, pp. 35-38.

Mexican Office Action dated Jul. 13, 2012 in corresponding Mexican Patent Application No. MX/a/2010/012932 with partial English translation (7 pages total).

* cited by examiner

AUTOMATIC CONFIGURATION OF INTER-DOMAIN ACCESS TECHNOLOGY NEIGHBOR RELATIONS

RELATED APPLICATION

This application claims the priority and benefit of U.S. provisional patent application 61/077,572 entitled "FEATURES FOR AUTOMATIC INTER INTER-RAT NEIGHBOR CONFIGURATION FOR ANDSF" filed Jul. 2, 2008, which is incorporated herein by reference in its entirety. This application also may be closely related to U.S. provisional patent application 61/049,214 entitled "Network Topology Discovery Function" filed Apr. 30, 2008 and U.S. patent application Ser. No. 12/368,504 entitled "Inter-Access Network Topology Discovery" filed Feb. 10, 2009.

TECHNICAL FIELD

Technical field of present disclosure relates to automatically configuring a neighbor relations map in which information on neighboring cells of different access technology domains—i.e., of inter-domain access technology—is maintained.

BACKGROUND

Access technologies of various kinds, especially for wireless communication, are becoming increasingly ubiquitous. Examples include GSM/GPRS/EDGE, WCDMA/HSPA, CDMA2000, WLAN, WiMAX, LTE and so on. Wireless terminals offered by vendors match this multitude of access technologies by including ever more access interfaces to allow greater freedom and flexibility in selection of access to use for each communication session.

In $3^{rd}$ Generation Partnership Project (shortened to "3GPP") Access Network Discovery and Selection Function (shortened to "ANDSF") is described. ANDSF, defined as a part of System Architecture Evolution (shortened to "SAE") within 3GPP provides user equipments (shortened to "UE") with policies and access network discovery and selection information (shortened to "access information"). UE can query the ANDSF for information about non-3GPP accesses. In response, ANDSF provides the access information which indicates when and where non-3GPP access may be available.

As depicted in FIG. 1, ANDSF 110 and UE 120 communicate with each other over a defined communication interface S14. ANDSF provides the access network discovery and selection information, and UE can use this information to determine which access to scan for and also to determine operator policies with regard to handovers. UE can decide to stay on its current access network, e.g. its home 3GPP access network, or perform a handover to a non-3GPP access network. ANDSF can also provide information about 3GPP accesses, typically to a UE connected to a non-3GPP access.

To efficiently support access network discovery and selection, ANDSF should provide UE with accurate information about availability of other accesses, and the information should be adapted to UE's current location. Unfortunately, there is no simple way to configure the ANDSF with this information. The task of configuring the ANDSF with localized neighbor relations information is likely to be huge and expensive. Information could be configured manually. However, it is tedious and cumbersome to manually configure and maintain relationships between every cell of a 3GPP access network (GSM, WCDMA, E-UTRAN, LTE, etc.) and surrounding non-3GPP cells. In addition, manual processes are inherently error prone.

SUMMARY

A non-limiting aspect of this disclosure relates to methods and apparatuses for automatically configuring a map of inter-domain access technology neighbor relations. A domain used herein refers to a set of access technologies, such as the set of 3GPP access technologies, in which the ANDSF is not required for access selection and discovery within the set. The neighbor relations map includes information on extra-domain neighbor relations (a neighbor relation between a domain cell and its non-domain neighboring cell) and non-domain neighbor relations (a neighbor relation between of two non-domain cell neighboring each other).

In a non-limiting embodiment, ANDSF configures the neighbor relations map based on neighbor relations data reports from reporting wireless terminals. Neighbor relations data can include data on extra-domain neighbors (data on non-domain cells that neighbor domain cells and/or data on domain cells that neighbor non-domain cells) and/or non-domain neighbors (data on non-domain cells that neighbor each other).

In a non-limiting embodiment, the reporting wireless terminals record the neighbor relations data as they scan their surroundings. Alternatively or in addition thereto, the reporting wireless terminals record the neighbor relations data as they perform extra-domain transitions (handovers or reselections between a domain cell and a non-domain cell) or non-domain transitions (handovers or reselections between two non-domain cells). The reporting wireless terminals report to the ANDSF the recorded neighbor relations data.

In a non-limiting embodiment, neighbor relations data recording and reporting behaviors of the reporting wireless terminals are dynamically configured through steering instructions from the ANDSF.

In a non-limiting embodiment, the ANDSF uses this continually evolving neighbor relations map to provide accurate access information to receiving wireless terminals, thereby providing efficient access guidance. The access information, which provides information on possible non-domain accesses, is adapted to the receiving wireless terminal's location.

A non-exhaustive list of beneficial features of the disclosed technology includes:

Batch reporting of neighbor relations data and access information;

Recording and reporting of neighbor relations including their access technologies;

Utilizing idle mode cell switches for detection of neighbor relations;

ANDSF controlled configuration of the wireless terminal's neighbor relations data recording and reporting behavior;

Including usefulness indicators, time stamps, etc. associated with each neighbor relation in the access information conveyed to the wireless terminal;

Suppression of frequently (of relatively recently) detected neighbor relations in neighbor relations data reports to the ANDSF, e.g., to minimize redundant reporting;

Treatment of visiting wireless terminals to receive neighbor relations data from visiting terminals and to provide access information to visiting terminals;

Including physical cell identities in the access information, thereby potentially simplifying a coming handover;

Integrating ANDSF's configuration of the wireless terminal's neighbor relation data recording and reporting behavior in a regular ANDSF policy and rule framework; and Filtering access information and neighbor relations data recording and reporting instructions to the wireless terminal, based on the terminal's access capabilities, neighbor relations map update needs, etc.

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale.

FIG. 5C illustrates a non-limiting example method performed by the wireless terminal to report neighbor relations data and to scan for non-3GPP access;

DETAILED DESCRIPTION

Figure 1:
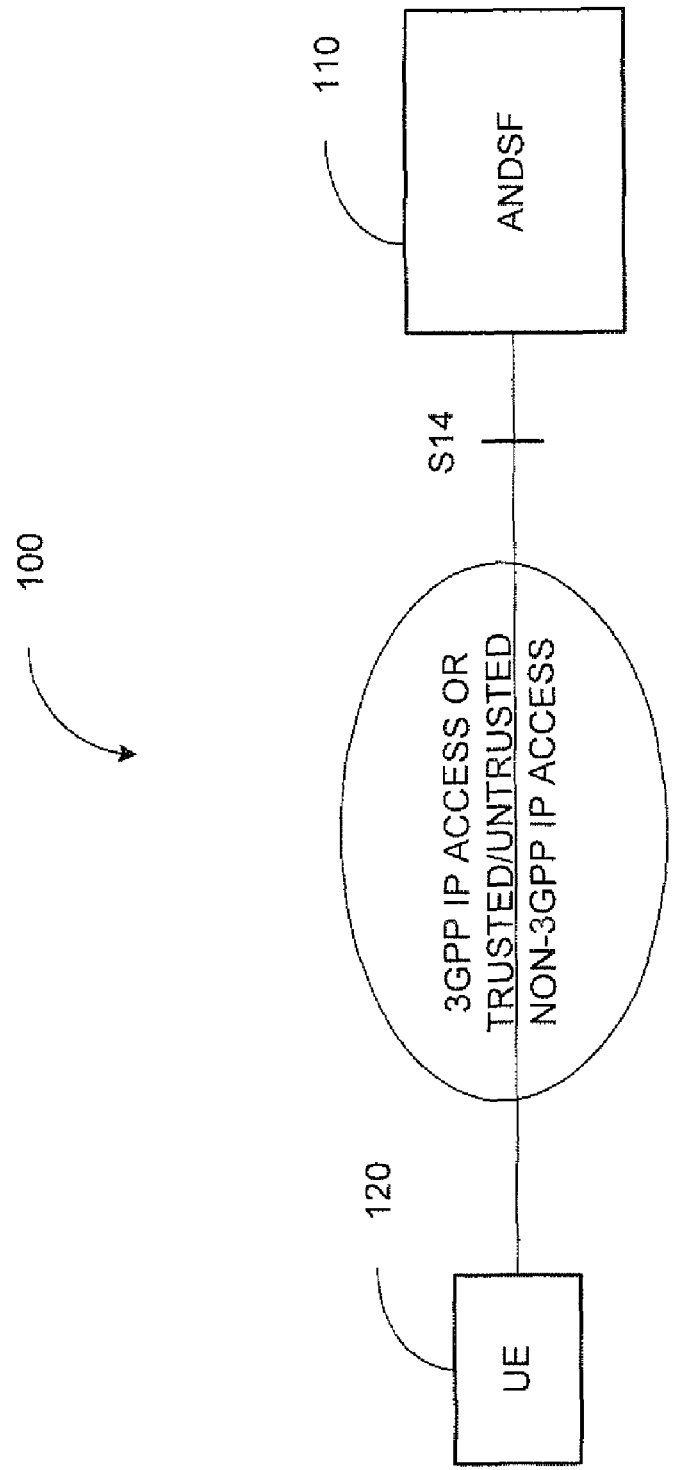
FIG. 1 illustrates an example 3GPP access network architectural setup that allows a UE to communicate with the ANDSF over a defined interface.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, terms "cell", "sector", "access point", "base station", and so on may be used interchangeably depending on the context. One should keep in mind that a "cell" is not equivalent to a "base station". Cell (or sector) refers to a radio coverage area and base station (or access point) refers to a radio communication equipment that provides radio coverage to the corresponding coverage area. Example radio communication equipments include eNodeBs in 3GPP, access points in WiFi (also referred to as "WLAN"), and base stations in WiMAX. A single equipment can support or serve multiple cells, typically by operating multiple antennas independently such as one antenna per cell or a set of coordinated antennas for each cell. The cells may even overlap. Nevertheless, it is assumed that each cell is individually identifiable, e.g., each cell can have a global cell identity.

Also in this document, 3GPP is primarily used as examples for explanation purposes. However, the scope of this disclosure is not limited to the set of 3GPP access technologies; scope thereof can encompass many domains of access technologies.

As noted above, multiple access technologies are available for wireless communication. Multi-access wireless terminals are also available to match this multitude of access technologies. This allows greater freedom and flexibility in selection of access to use for each communication session.

To leverage benefits of this growing flexibility, it is desirable to efficiently control access selection to ensure that the wireless terminals use their available access interfaces and access networks as efficiently as possible for ongoing communication sessions. Some considerations to take into account for efficient operation include: currently used applications, access network technologies and their properties, access network operators and their relations to user's home operator, operator network policies, current conditions of the network such as load, the wireless terminal's current location, subscription restrictions, time of day, and many others. It is also desirable to support the wireless terminals in discovering available accesses without requiring the terminals to continuously scan for all accesses so that battery resources can be conserved.

Multi-access—i.e., access across differing access technologies—is recognized by many to be an important element. In 3GPP, multi-access includes support for control of access selection and access discovery for movements and selection for 3GPP UEs between 3GPP domain of access technologies (e.g., GSM, WCDMA, E-UTRAN (SAE/LTE), UTRAN, GERAN) and non-3GPP domain (e.g. WiMAX, WLAN) and vice versa. For clarity, following terminologies are also introduced:

extra-3GPP access selection/discovery—access selection/discovery for a 3GPP US between 3GPP access and non-3GPP access and vice versa;

extra-3GPP neighbor—a non-3GPP cell that is a neighbor of a 3GPP cell and vice versa;

extra-3GPP neighbor relation—a neighbor relation between a 3GPP cell and an extra-3GPP neighbor and vice versa;

extra-3GPP handover—a handover of a 3GPP UE between 3GPP domain and non-3GPP domain and vice versa; and extra-3GPP cell reselection—a movement in idle mode of a 3GPP UE between 3GPP domain and non-3GPP domain and vice versa.

Multi-access also includes support for movements and selections for 3GPP UEs between two non-3GPP access technology domains, i.e., between one non-3GPP access (e.g. WiMAX, WLAN) and another non-3GPP access (e.g. WiMAX, WLAN). Following terminologies are also introduced for clarity:

non-3GPP access selection/discovery—access selection/discovery for a 3GPP UE between two non-3GPP access networks;

non-3GPP neighbors—two non-3GPP cells of different access networks (of the same type or different types) that are neighbors of each other;

non-3GPP neighbor relation—a neighbor relation between two non-3GPP neighbors;

non-3GPP handover—a handover of a 3GPP UE between two non-3GPP access networks; and non-3GPP cell reselection—a movement in idle mode of a 3GPP UE between two non-3GPP access networks (of the same type or different types).

In this context, non-3GPP cell reselection may also be described as an idle mode movement of a 3GPP UE between non-3GPP cells without "significant" intervals between detections of the respective cells. Non-3GPP access networks may employ same access technology or can employ different access technologies.

In 3GPP, accesses among cells of 3GPP access technologies (e.g. GSM, WCDMA, E-UTRAN, UTRAN, GERAN) normally do not involve the ANDSF because the underlying mechanisms of 3GPP include support for handling access selection and discovery among each other. For example, a handover of a UE from an E-UTRAN cell to a UTRAN cell is handled within the 3GPP mechanisms. Thus, the ANDSF is not required for intra-3GPP access selection. ANDSF enables access selection and discovery for access networks that are outside the 3GPP domain such as WiFi and WiMAX and between the 3GPP domain and non-3GPP accesses.

In this context, the terminologies "extra-3GPP" and "non-3GPP" are not meant to limit the scope of the disclosed technology to 3GPP. Rather, 3GPP is an example of a domain of a set of access technologies (or simply "domain"). Within the domain, i.e., within the set of access technologies that constitute the domain, the underlying mechanisms of the set support access selection and discovery among the access networks within the set without assistance from the ANDSF. That is to say, the ANDSF is not required for intra-domain access selection and discovery.

Thus, where appropriate, terms "extra-domain" and "non-domain" will be used. In this context, the terminologies introduced above are rephrased and defined as follows:

extra-domain access selection/discovery—access selection/discovery for a wireless terminal between domain and non-domain accesses and vice versa;

extra-domain neighbor—a non-domain cell that is a neighbor of a domain cell and vice versa;

extra-domain neighbor relation—a neighbor relation between a domain cell and its extra-domain neighbor and vice versa;

extra-domain handover—a handover of a wireless terminal from a domain cell to a domain cell and vice versa;

extra-domain cell reselection—a movement in idle mode of a wireless terminal from a domain cell to a non-domain cell and vice versa;

non-domain access selection/discovery—access selection/discovery for a wireless terminal among non-domain accesses;

non-domain neighbor—a non-domain cell that is a neighbor of another non-domain cell;

non-domain neighbor relation—a neighbor relation between two non-domain neighbors;

non-domain handover—a handover of a wireless terminal between two non-domain cells of different access networks (of the same type or different types); and non-domain cell reselection—a movement in idle mode of a wireless terminal between two non-domain cells of different access networks (of the same type of different types).

Figure 2A:
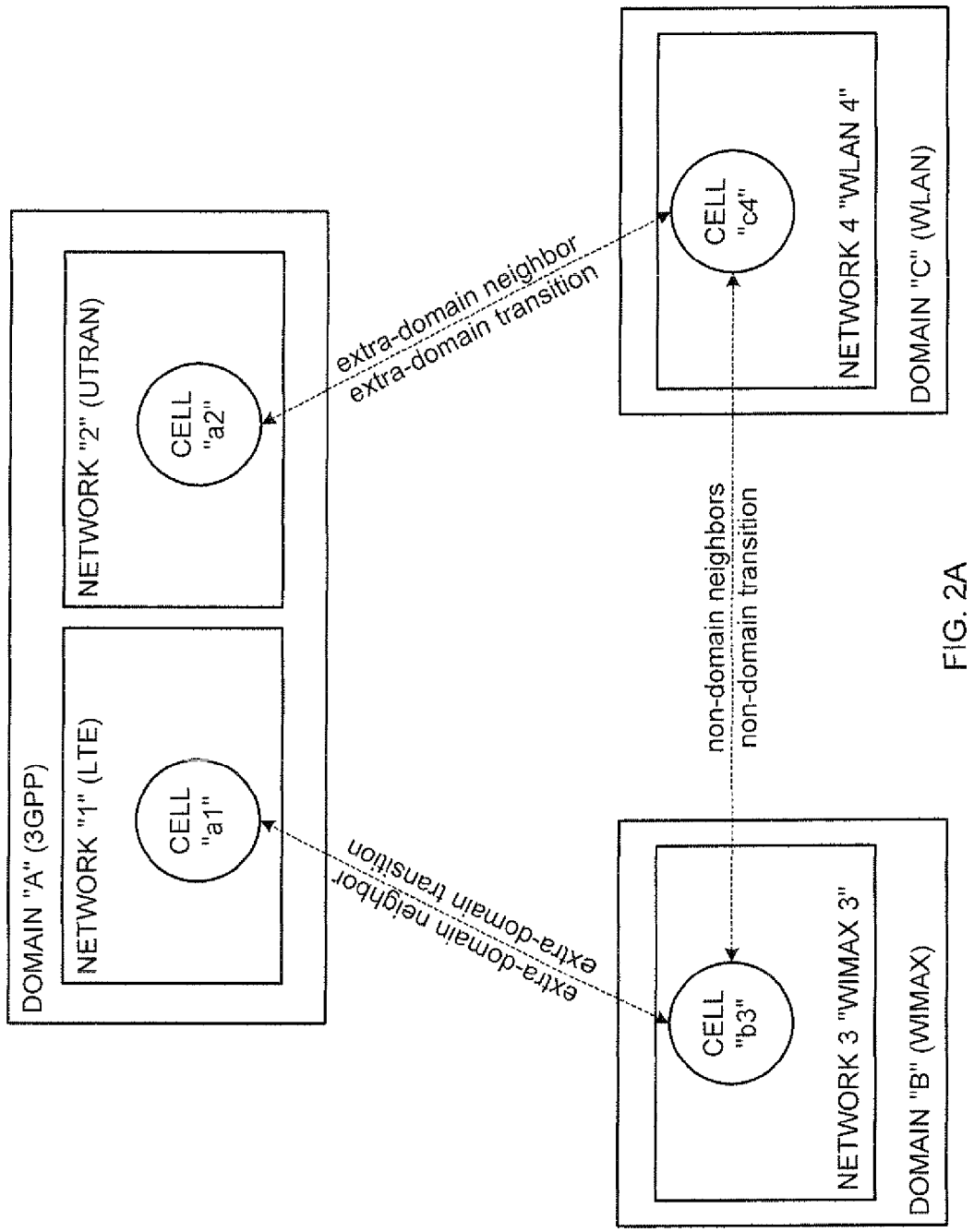
FIG. 2A illustrates a non-limiting example for explanation of domains.

FIG. 2A provides a non-limiting example to explain the domain concept. Three access technology domains are shown in the figure—domain "A" (e.g., 3GPP), domain "B" (e.g., WiMAX), and domain "C" (e.g., WLAN). Within each domain, there are one or more access networks, and within each access network there is at least one cell that provides radio interface services to the wireless terminals. For explanation purposes, domain A's perspective is used.

From the domain A's perspective, cells "a1" and "a2" are both domain cells and cells "b3" and "c4" are non-domain cells. Cell b3 is an extra-domain neighbor to cell a1. Similarly, cell c4 is an extra-domain neighbor of cell a2. Finally, cells b3 and c4 are non-domain neighbors. In simplified example, neighbor relations can be expressed as order pairs in which (a1, b3) and (a2, c4) are extra-domain neighbor relations and (b3, c4) is a non-domain neighbor relation. For brevity, handovers and reselections are generically referred to as "transitions" and will be expressed in shorthand with "↔". Thus, a1 "↔" b3 and a2 "↔" c4 are examples of extra-domain transitions and b3⇆c4 is an example of a non-domain transition.

ANDSF in the generalized context enables extra-domain and non-domain access selection and discovery. Reader should note that while the ANDSF is not required for intra-domain access selection and discovery, the ANDSF is not necessarily prevented from being used for such purpose either. However, extra- and non-domain are emphasized and described over the intra-domain in this document in recognition that there may be more efficient mechanisms than the ANDSF for the intra-domain access selection and discovery.

Figure 2B:
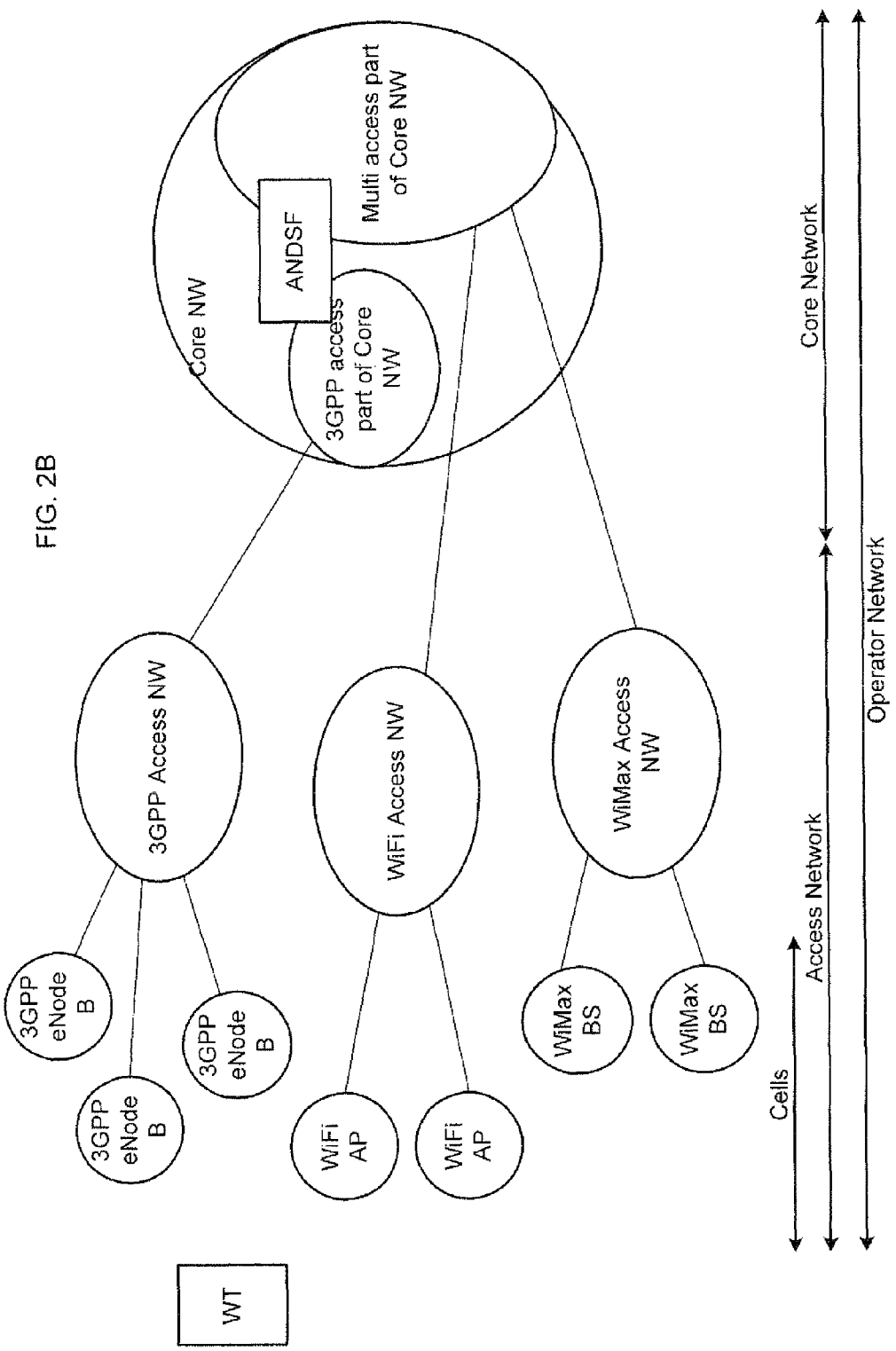
FIG. 2B illustrates a non-limiting example relationship hierarchy among an operator network, a core network, access networks, and cells.

To provide a context for understanding some of the details of embodiments that will be described, relationships between access networks and the ANDSF within a make up of an operator network is explained with reference to FIG. 2B. Operator network can be viewed as a totality of a communication system operated by a particular operator. As illustrated, operator network includes one or more access networks enabling communication with the wireless terminals ("WT" in the figure). Each access network uses a particular access technology to communicate with the wireless terminals. A non-exhaustive examples of access technologies include 3GPP (GSM/GERAN, UTRAN, E-UTRAN, etc.), WiFi also referred to as "WLAN", and WiMAX.

Each access network includes one or more cells. In this figure, cells are associated with radio communication equipments—base stations (shortened to "BS") for WiMAX, access points (shortened to "AP") for WiFi, Node Bs for UTRAN, eNodeBs for E-UTRAN, etc.—which provide radio interfaces to the wireless terminals. While not illustrated, each access network may include node elements (gateways, radio network controllers, etc.), in addition to radio communication equipments, that support cells.

Operator network also includes a core network positioned in a logical hierarchy above the access networks. Core network provides functions such as mobility management, session management, user management, roaming, and so on. Core network can support multiple access networks and can also include functions specific to a particular access network. In FIG. 2B, ANDSF is included in the core network.

As shown, one operator can operate plural access networks and each access network uses an access technology of a domain. For example, one access network will use 3GPP and another will use WiMAX. While not shown, operator may choose to implement two or more access networks within one access technology domain for operational purposes or some other reasons. For example, an operator may choose to deploy E-UTRAN and GERAN access networks both employing 3GPP access technologies.

Also, designation "home" is relevant in that a wireless terminal will normally communicate with the ANDSF in the same operator network where the user of the terminal has his/her subscription over a defined interface—e.g., the S14 interface in 3GPP—to receive the access information and, in accordance with one or more embodiments of the technology disclosed herein, report the neighbor relations data. ANDSF accessible in this manner is a home ANDSF from the perspective of that wireless terminal.

For a visiting wireless terminal—(i.e. a terminal whose user has his/her subscription with another operator network)—the same ANDSF would be its visited ANDSF. A visiting wireless terminal may communicate directly with a visited ANDSF via the same type of interface as with its home ANDSF—e.g. S14 interface in 3GPP—or via another type of interface or indirectly via the home ANDSF. Generally, ANDSF refers to any entity capable of providing access information to the wireless terminals.

To provide the access information, a map of neighbor relations is configured—i.e., built and maintained in the ANDSF. A non-limiting example of an interaction between the ANDSF and the wireless terminals to configure and use the neighbor relations map is described with references to FIGS. 3A, 3B, and 3C in which FIG. 3A broadly illustrates a non-limiting example of information exchanges between the ANDSF and the wireless terminals; FIG. 3B broadly illustrates a non-limiting example method performed by the ANDSF to build the map and to provide the access information; and FIG. 3C broadly illustrates a non-limiting example method performed by a wireless terminal to report the neighbor relations data and to scan for potential (typically non-domain) accesses.

In a non-limiting embodiment, ANDSF automatically configures the neighbor relations map (step S310). The map includes localized neighbor relations of inter-domain cells—i.e., neighboring cells of different access technology domains—or neighbor relations between cells of the same access technology domain belonging to different access networks (e.g. a WiMAX cell which is neighbor to a WiMAX cell in another WiMAX network). In particular, the map includes extra-domain and non-domain neighbor relationships. For a 3GPP domain, the map would include extra-3GPP and non-3GPP relations.

With the neighbor relations map, the ANDSF provides the wireless terminals with accurate access information (step S320) tailored to the locations of the terminals. Armed with accurate access information, a wireless terminal can efficiently scan for one or more cells (domain and/or non-domain) for possible access (step S325). The terminal can minimize scanning in vain, which minimizes unnecessary power consumption, by scanning for cells when they are most likely to be available and avoid scanning for accesses whose availabilities are unlikely.

Wireless terminals provided with insufficient access information can sporadically scan for non-domain accesses when located in a domain cell or scan for both domain accesses and non-domain accesses when located in a non-domain cell or when not located in any cell at all (e.g. out of radio coverage).

As illustrated, ANDSF builds the neighbor relations map (step S310) based on the neighbor relations data that the wireless terminals record and report (step S315) as they perform extra- or non-domain transitions—i.e., handovers or cell reselections. In another non-limiting embodiment, ANDSF builds the map (step S310) based on the neighbor relations data that the wireless terminals record and report (step S315) as they scan their surroundings. Neighbor relations map includes information on relationships of neighboring cells. The neighbor relations map includes information on extra- and non-domain neighbor relations.

Figure 3A:
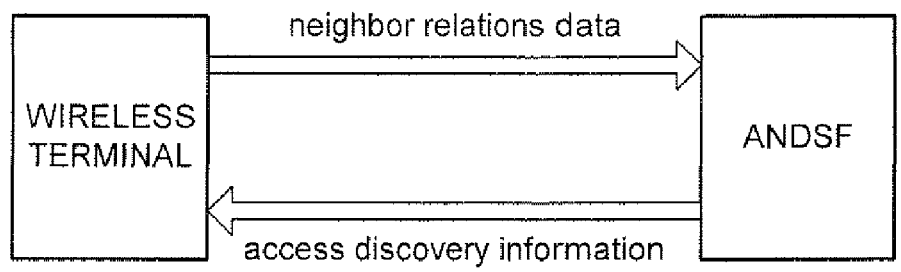
FIG. 3A illustrates a non-limiting example information exchange between the ANDSF and the wireless terminals.
Figure 3B:
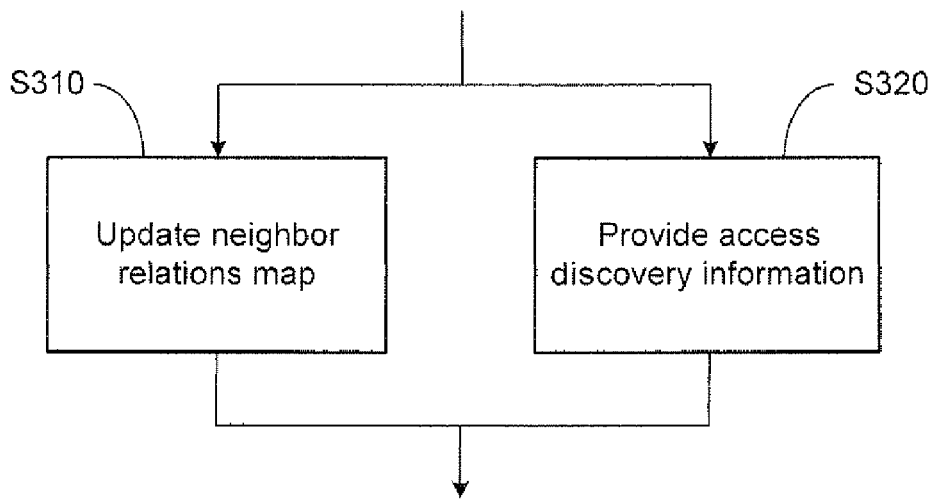
FIG. 3B illustrates a non-limiting example method performed by the ANDSF to configure neighbor relations map and to provide access information.
Figure 3C:
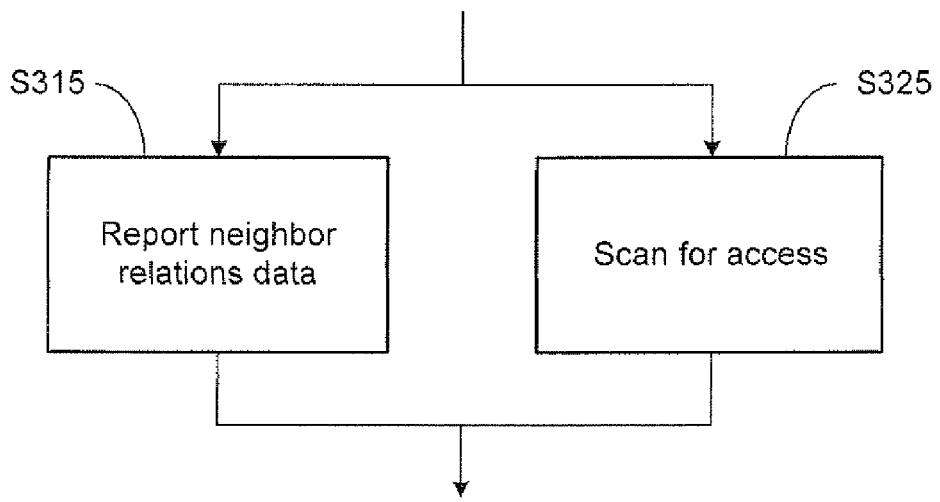

FIGS. 3A, 3B, and 3C show that both the ANDSF and the wireless terminals take part in building the neighbor relations map, and both benefit from the other's participation. ANDSF benefits from receiving the neighbor relations data from the wireless terminals to build the map and the wireless terminals benefit by receiving accurate access information (derived based on the map) from the ANDSF.

Some desired (albeit not all required) traits of the neighbor relations map include:

Accuracy—neighbor relation information contained therein should have some measure of reliability;

Comprehensive—wide geographical coverage, as many access technologies as possible, etc.; and Reconfigurable—continually adapt to changing circumstances (e.g., quickly gather neighbor relations of newly deployed access networks).

To maintain these and other desirable map traits, ANDSF should continually be provided with up-to-date neighbor relations data. However, such continual provision can consume system resources that could otherwise be used to provide subscriber services to generate revenue for the operator. In addition, excessive provision of the neighbor relations data consume battery power in the involved wireless terminals. Thus, it is desirable optimize the system's operation to maximize delivery of "quality" neighbor relations data to the ANDSF and minimize stress and load imposed on the system and terminal batteries consumption while doing so. Term "quality" simply indicates that necessary and/or important data should be delivered rather than unnecessary and/or unimportant data. Duplicate neighbor relations data is an example of unnecessary data.

There are numerous implementations to achieve such optimization. One or more non-limiting implementations of the disclosed technology allow the ANDSF to send instructions to a wireless terminal on which of such implementations/optimizations to use and how to use them, to tune the wireless terminal's behavior in terms of collecting, recording and reporting neighbor relations with the ultimate goal of optimizing the building and maintaining of the neighbor relations (i.e. extra-domain and non-domain neighbor relations) map in relation to the resources that are consumed in the process.

One such implementation is to minimize redundant neighbor relations data reporting. To enable reporting, system resources are consumed to establish connection, such as the S14 connection in 3GPP, between a wireless terminal and the ANDSF. Resources can also be consumed to disconnect. Minimizing redundant reporting minimizes resource consumption for reporting data that the ANDSF already has.

Another implementation is to blacklist cells—i.e., do not record/report data on specified cells. As an example, an operator of a network may not have a roaming agreement in place with another network. Thus, data on that other network is useless. Another example is blacklisting a certain type of access network (i.e. a certain access technology), e.g. because the operator network does not support this type of access technology. Through blacklisting, resources need not be consumed to record/report useless data.

Another implementation is for a wireless terminal to wait until it has a minimum number of neighbor relations to report. To establish a connection between a wireless terminal and the ANDSF so that the terminal can transmit its report, signaling overhead is normally incurred and this overhead is more or less constant per connection. Some overhead is usually incurred to disconnect as well. Waiting until the minimum number of relations have been accumulated avoids frequent connections for transferring small amounts of data. This in turn reduces the amount of resources consumed for overhead in comparison.

Another implementation is for a wireless terminal to use opportunistic reporting. Instead of establishing a connection with the ANDSF specifically for the purpose of reporting its neighbor relations data, the terminal can transmit its report to the ANDSF over a connection already established for some other purpose. This minimizes signaling overhead resource consumption. As an option, the minimum number constraint described just above could be suspended for opportunistic reporting since the overhead costs are not incurred (or there is very little).

In another optimization implementation, a wireless terminal can report its data during non-busy times such as at nights and on weekends, when the system including the ANDSF are likely to have spare capacity. This minimizes strain and/or stress to the system. As an option, constraints such as the minimum number of relations could be suspended during these times as well.

In another way, a wireless terminal can prioritize its reporting of neighbor relations data. In one example, reporting data on a newly deployed access network or particular access technologies can be prioritized over others. This allows the ANDSF to update the map to reflect changing circumstances relatively quickly. In another example, neighbor relations of a particular region may be old (last update happened long ago) putting into question the accuracy of the region's information. The wireless terminal can prioritize reporting of neighbor relations data for this region to quickly update the map. As an option, constraints can be suspended or lowered for reporting high priority data.

These are but few examples of available optimization techniques. Since the wireless terminals are the actual entities that collect, record, and report neighbor relations data, it is desirable to configure the wireless terminal's neighbor relations data recording and reporting (shortened to "data recording/reporting") behavior so that above-noted and other optimizations may be implemented. Optimizations should be based on the neighbor relations map so that necessary and/or important updates can be made to the map. Since ANDSF configures and maintains the neighbor relations map, ANDSF is well suited determine what updates are necessary or desirable. Thus, in a non-limiting embodiment, ANDSF dynamically configures the data recording/reporting behaviors of the wireless terminals so that required data is available timely so that the necessary or desired updates can be made.

In a non-limiting embodiment, configuration of neighbor relations data recording and reporting is integrated in policies/rules framework of the ANDSF. As an example, "neighbor relationship recording and reporting policy" could be defined. ANDSF can provide this policy to the wireless terminals to steer them on various aspects of neighbor relations data recording and reporting. That is, the policy can steer the wireless terminals on what, where, when, and/or how to record and report. The policy can be delivered using typical delivery mechanisms such as those existing in 3GPP for the S14 interface. The policy can have conditional scopes attached. For example, some of the policy's provisions could be in effect depending on time of day, load on the system, the wireless terminal's location, multi-access capability of the wireless terminal, and so on.

Figure 4A:
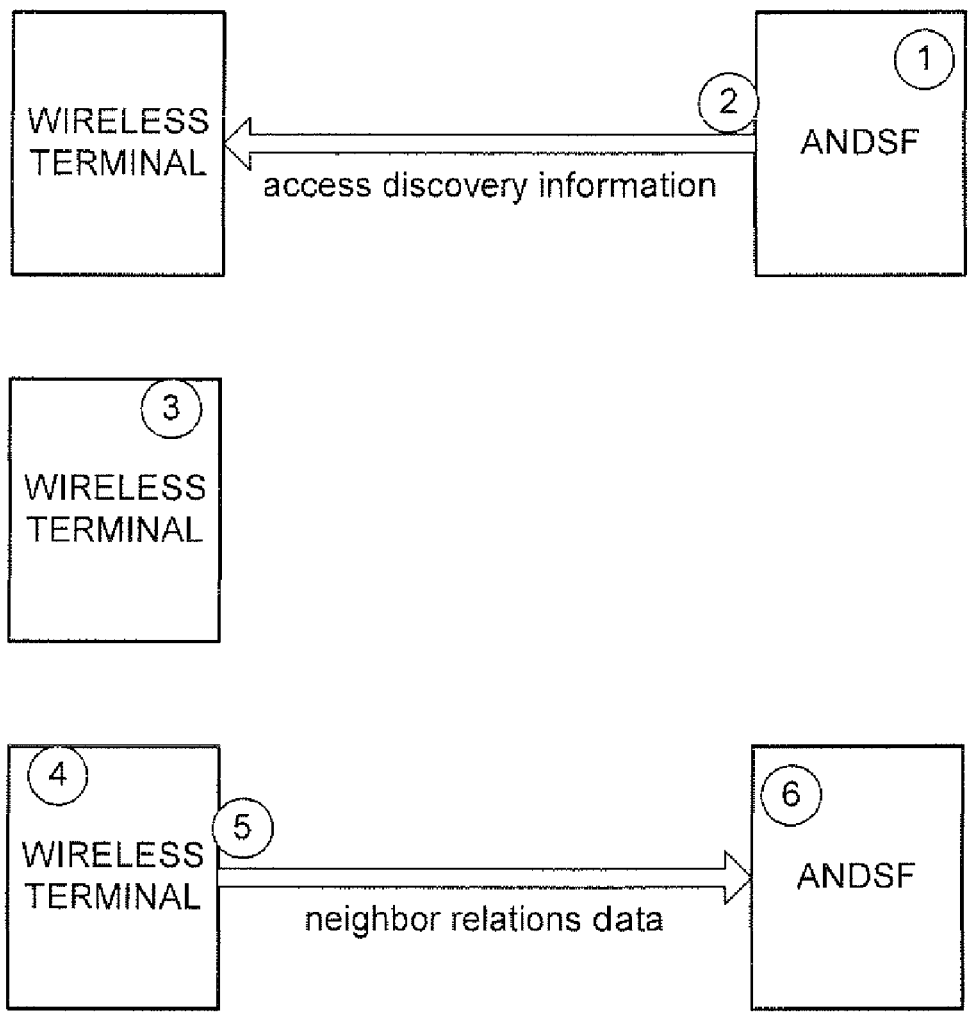
FIGS. 4A, 4B, and 4C illustrate a non-limiting example realization of integrating ANDSF's configuration of the wireless terminal's neighbor relation data recording and reporting behavior in a regular ANDSF policy and rule framework.
Figure 4B:
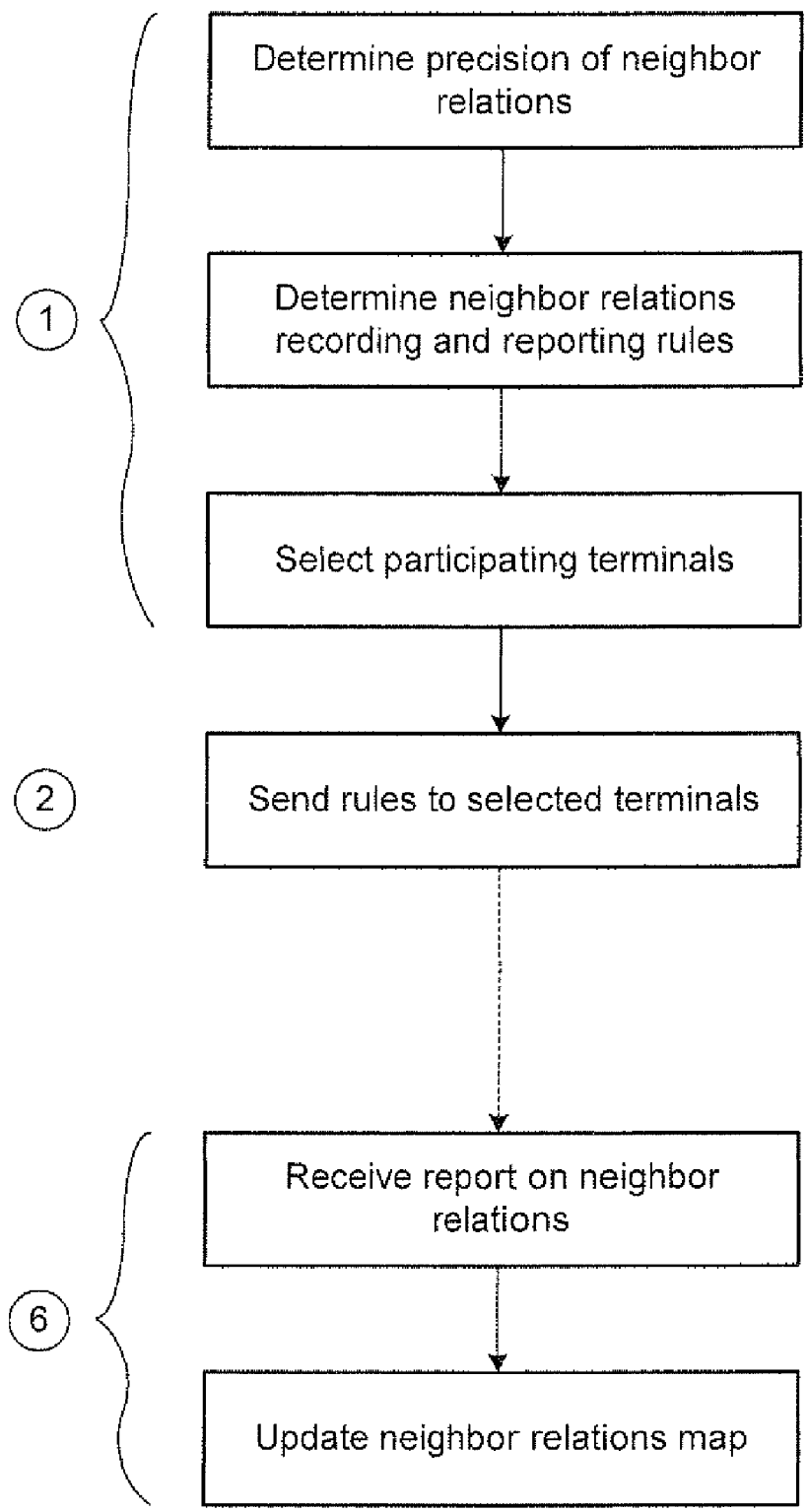
Figure 4C:
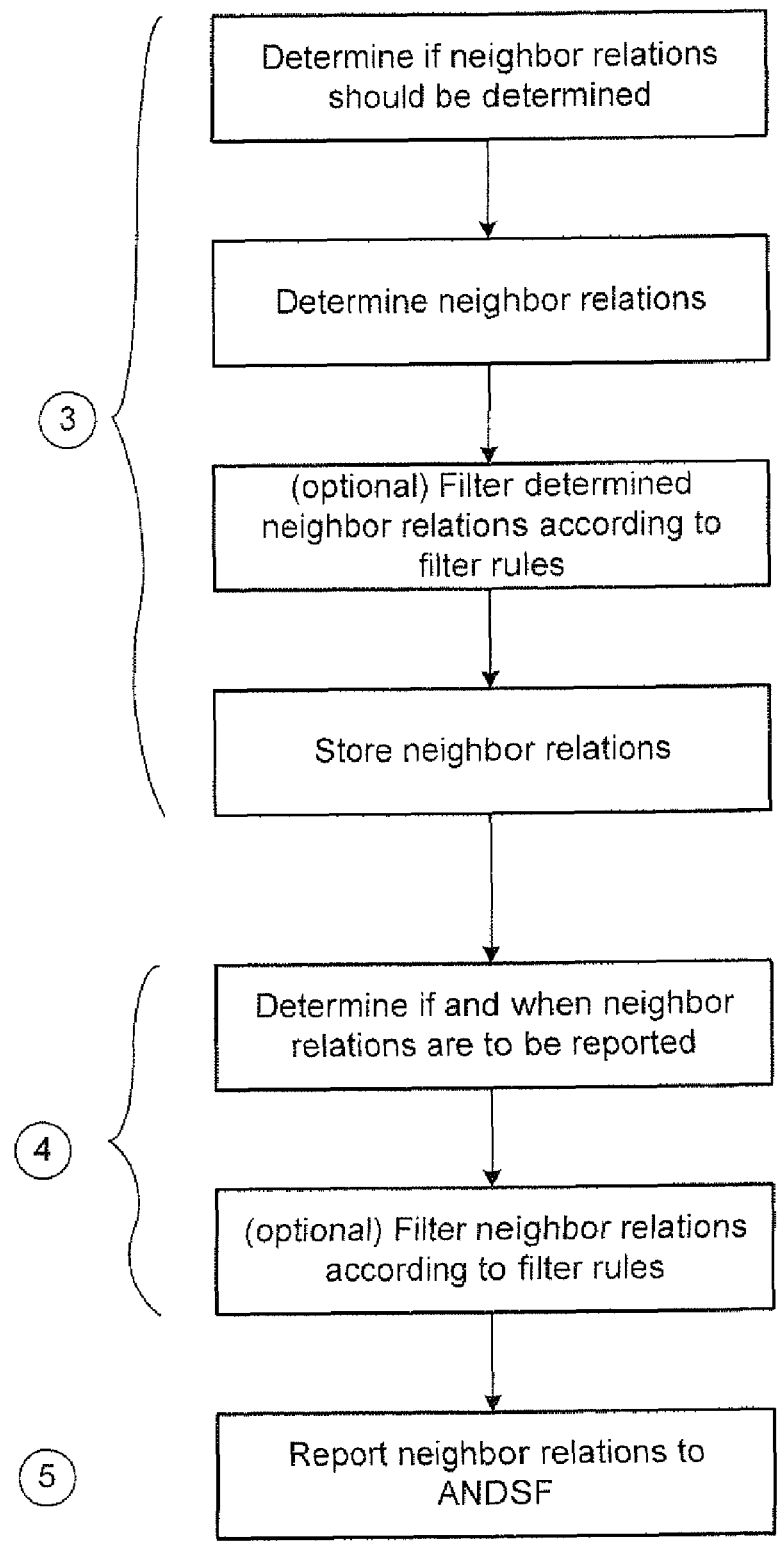

This frame work is explained with references to FIGS. 4A, 4B, and 4C which illustrate a non-limiting example implementation of the neighbor relationship recording and reporting policy. In this frame work, sequences (1)-(6) are conducted—some by the ANDSF and some by the wireless terminals—so that needed and/or desired neighbor relations data are collected and reported to the ANDSF by the wireless terminals.

In sequence (1), ANDSF conducts the following (see also FIG. 4B):

Determine availability and precision of neighbor relations in its neighbor relations map. For example, ANDSF may determine that neighbor relations information of a particular region is old, e.g, time stamp(s) indicate that a predetermined amount of time has passed since the last update in the region, or it may determine that the map lacks data on a particular access network.

Determine neighbor relations recording and reporting rules that improve completeness and quality of neighbor relations in the map. These rules can be limited in scope. For example, rules may specify that neighbor relations are to be recorded only for certain geographical regions, only for certain access networks, only for certain access technologies, etc. As another example, rules may specify that reporting is to be performed only during non-busy hours.

Determine which wireless terminals will participate in neighbor relations recording and reporting. As an example, wireless terminals with certain access technology capabilities, under specific subscription, with durable power supplies (such as car charger), etc., can be selected.

In sequence (2), ANDSF 110 transmits neighbor relations recording and reporting rules to the selected wireless terminals.

In sequence (3), the wireless terminal conducts the following to record data (see also FIG. 4C):

Determine if neighbor relations should be determined. In a non-limiting embodiment, the wireless terminal can have one or more neighbor relations recording and reporting rules. It determines if conditions are met for any of the rules.

Determine neighbor relations, e.g. by scanning for available cells or performing a transition (i.e. handover or movement in idle mode), for rules whose conditions are met.

Optionally filter any determined neighbor relations according to recording rules from the ANDSF or based on locally stored filtering principles For example, data on cells of blacklisted access networks can be removed or not recorded at all.

Store remaining neighbor relations.

In sequence (4), the wireless terminal conducts the following to report data:

Determine if and when locally stored neighbor relations are to be reported to the ANDSF. This may depend on the reporting rules provided by the ANDSF or on locally stored reporting principles. For example, reports can be sent whenever the wireless terminal performs a signaling procedure (such as location/tracking/routing area update), whenever the wireless terminal is in a signaling procedure with the ANDSF, whenever a timer expires, when a number of neighbor reports exceeds a threshold, when a polling request is received from the ANDSF, etc.

Optionally, filter neighbor relations before reporting according to reporting rules from the ANDSF or locally stored filtering rules. For example, only neighbor relations for a certain geographic location may be reported.

In sequence (5), the wireless terminal transmits the neighbor relations data to the ANDSF.

In sequence (6), ANDSF receives reports of neighbor relations and updates the neighbor relations map accordingly (see FIG. 4B).

In a non-limiting embodiment, the neighbor relations recording and reporting rules are included in the steering instructions provided from the ANDSF to the wireless terminals, which record and report neighbor relations data according to the steering instructions, and the ANDSF configures the neighbor relations map based on the data from the wireless terminals. Based on the neighbor relations map, the ANDSF provides the access information to the wireless terminals in which the discovery information is adapted to the wireless terminal locations.

Figure 5:
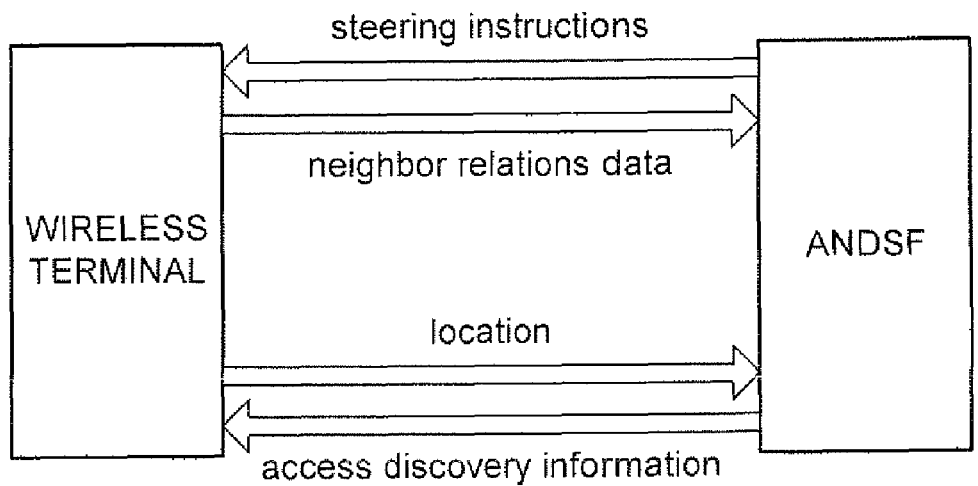
FIG. 5 illustrates another non-limiting example information exchange between the ANDSF and the wireless terminals.

This exchange is illustrated in FIG. 5, which can be viewed as a more detailed example of FIG. 3A. Note that the information on the location of a wireless terminal, which in FIG. 5 is illustrated as being sent from the wireless terminal to the ANDSF, may also be conveyed to the ANDSF by other means, e.g. sent from a network node, e.g. a Mobility Management Entity (MME in an SAE core network, a Home Subscriber Server (HSS), a Policy and Charging Rules Function (PCRF) or an Application Function (AF) server.

Figure 6:
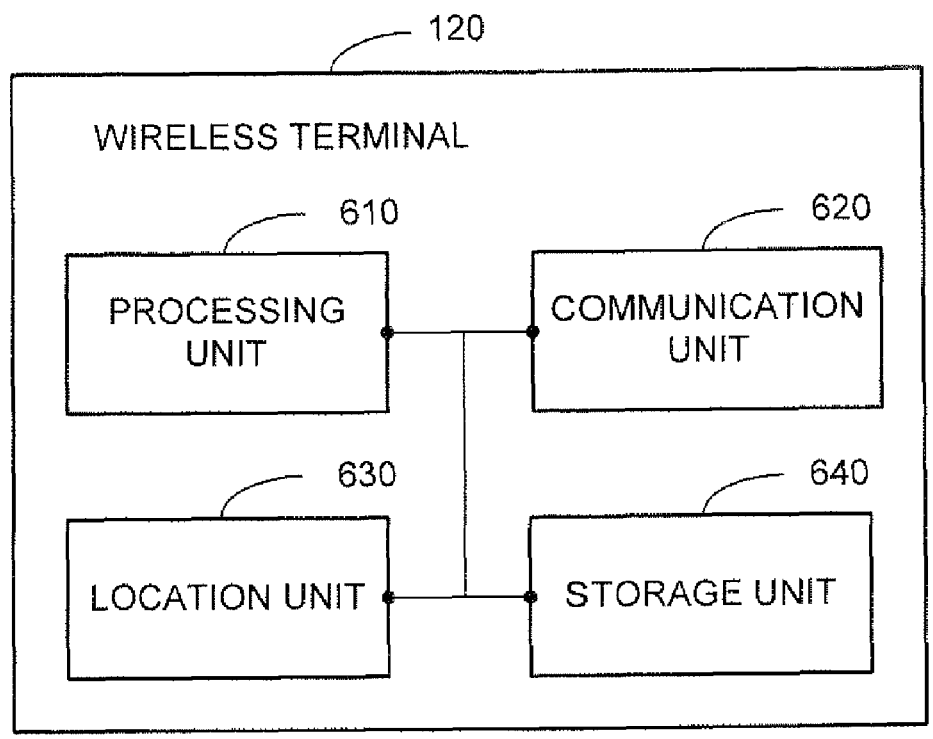
FIG. 6 illustrates a non-limiting example embodiment of a wireless terminal.

FIG. 6 illustrates a non-limiting embodiment of a wireless terminal, which includes, among others, a processing unit 610, a communication unit 620, and a storage unit 630. The wireless terminal can include a location unit 640. The processing unit 610 is arranged to control other units of the wireless terminal to provide communications services to a user. The communication unit 620 is arranged to communicate with cells of plural access networks and plural access technologies. In addition, through defined interfaces, the communication unit 620 is arranged to communicate with the ANDSF. The storage unit 630 is arranged to store information necessary for operation of the wireless terminal. The location unit 640 is arranged to determine the wireless terminal's current location.

Figure 7:
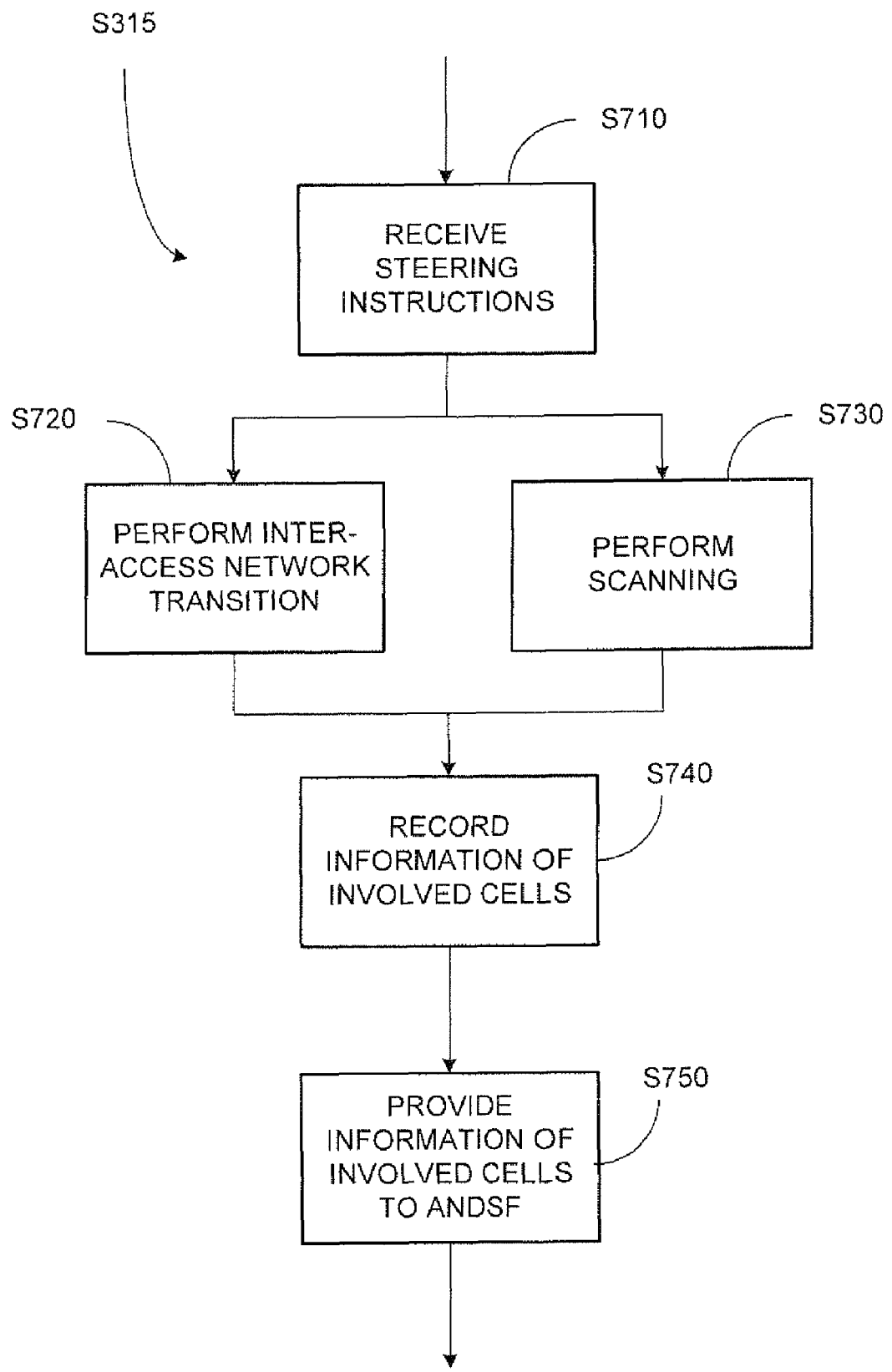
FIG. 7 illustrates a non-limiting example method the wireless terminal performs to record neighbor relations data and report them to the ANDSF.

FIG. 7 illustrates a non-limiting example method that a wireless terminal performs to implement step S315 of reporting neighbor relations data to the ANDSF. For clarity, wireless terminals reporting the neighbor relations data are referred to as "reporting" terminals. Conversely, wireless terminals receiving the access information will be referred to as "receiving" terminals. This is not to imply that there are indeed separate reporting and receiving terminals—a wireless terminal can be both. The terms are merely used to clarify the description context.

As mentioned previously, a reporting terminal can record neighbor relations data as it performs extra- or non-domain transitions or as it scans its surroundings. In the method of FIG. 7, the communication unit 620 receives steering instructions from the ANDSF in step S710. In step S720, the communication unit 620 performs the extra- or non-domain transition. Consistent with the steering instructions, the processing unit 610 records data of the cells involved in the transition to the storage unit 630 in step S740. In a non-limiting embodiment, the wireless terminal may perform the transition because radio conditions or selection rules trigger it to do so, and the terminal may opportunistically use the transition to record the neighbor relations data.

The communication unit 620 scans for cells in step S730 and the processing unit 610 records data of detected cells to the storage unit 630 in step S740. Typically, the communication unit 620 will scan for non-domain cells in step S730. However, there can be occasions in which the communication unit 620 will scan for domain cells in addition to or alternatively to scanning for non-domain cells. For example, the wireless terminal may be connected to a non-domain access. In this instance, the terminal may scan for other non-domain cells to detect non-domain neighbor relation and/or scan for domain cells to detect extra-domain relations. Scanning may be triggered due to radio conditions, selection rules, or the steering instructions. Steps S720 and S730 are examples of ways of collecting the neighbor relations data.

A non-exhaustive list of data that can be recorded for the cells in step S740 includes:

Access technology (3GPP, WiMAX, WiFi, etc.);

Global cell identity;

Physical cell identity—typically a low-level/physical layer identity which is easy to retrieve, but is not guaranteed to be unique within a network (e.g. a PCI in E-UTRAN, a scramble code in UTRAN, a preamble code in WiMAX, etc.);

Carrier frequency;

Carrier bandwidth;

Registration area identity (e.g. LAC, LAI, RAC, RAI, TAC, TAI, etc.)—in some cases this is included in the global cell identity;

Network identity (such as PLMN identity in 3GPP) and/or operator identity—in some cases this is included in the global cell identity;

Cell specific configuration data;

Success/failure (if handover or idle mode movement conducted);

Location information, such as geographical coordinates retrieved using GPS or Galileo.

At a minimum, the processing unit 610 preferably records access technology, global cell identity, and carrier frequency of each cell. Other cell data that can be recorded include physical cell identity, carrier bandwidth, registration area identity, network identity, operator identity, cell specific configuration, success/failure of handover or movement in idle mode, and location. In addition to data on the involved or detected cells, location of the wireless terminal, e.g., geographical coordinates such as GPS, as determined by the location unit 640 can be included in the neighbor relations data.

In step S750, the communication unit 610 reports the recorded neighbor relations data to the ANDSF. There are many ways in which the wireless terminal can provide the neighbor relations data to the ANDSF. A non-exhaustive list of such ways include:

Specifically contact the ANDSF for the purpose of reporting neighbor relations data;
Opportunistically report the data (when anyway communicating with the ANDSF for another reason);
Respond to a poll from the ANDSF; or
As otherwise provided in the steering instructions.

The steering instructions, which can be recorded in the storage unit 630, specify neighbor relations data recording/reporting behavior of the reporting terminal. Capability to dynamically configure the data recording/reporting behavior is advantageous. For example, there may be a newly deployed access network "A" of an access technology outside the domain, that is, network "A" is a non-domain access network. So that the neighbor relations map can be updated quickly, the steering instructions may instruct the reporting terminals to record and report neighbor relations data for network "A" cells, and may even prioritize such data gathering.

As another example, the newly deployed network "A" may be of an access technology that is within the domain. In this instance, the ANDSF may form steering instructions to discover extra-domain neighbors of the newly deployed network "A".

As yet another example, current operator may have reached a roaming agreement with a non-domain access network "B". ANDSF can steer the reporting terminals to record and report neighbor relations data for network "B" cells. Conversely, the ANDSF may be aware that a non-domain access network "C" has been deployed but there is no working relationship yet between the operators. In this instance, the ANDSF can instruct the reporting terminals to black list network "C" cells.

Note that the steering instructions are not the only source of determining the data recording/reporting behavior of the wireless terminal. In a non-limiting embodiment, one or more wireless terminals can be configured with default data recording/reporting principles. Default principles can be in effect when the reporting terminal is initially put into service or when the terminal is reset to factory specifications for whatever reason. The default principles can be in effect until a first receipt of the steering instructions. In another non-limiting embodiment, the default principles can be fixed, i.e., the data recording/reporting behavior cannot be reconfigured.

While not explicitly illustrated in FIG. 7, note that the reporting terminal can receive steering instructions from the ANDSF at any time, not just prior to steps S720 or S730. While the reporting terminal performs steps S720-S750 based on the steering instructions received in step S710, these steps need not be performed in the specific order as illustrated. Indeed, step S710 can occur at any time and steps S720-S750 can be performed at any time as well. Also, the reporting terminal can perform these steps repeatedly to continually record and report the neighbor relations data to the ANDSF.

Steering instructions can be treated in many ways. For example, subsequently received steering instructions can supersede any previously received instructions including default principles. As another example, steering instructions may be limited in duration or can be in effect indefinitely until subsequent instructions are received. If instructions are duration limited and the duration passes without receipt of further instructions, the reporting terminal may revert to default principles which can include doing nothing.

Figure 8:
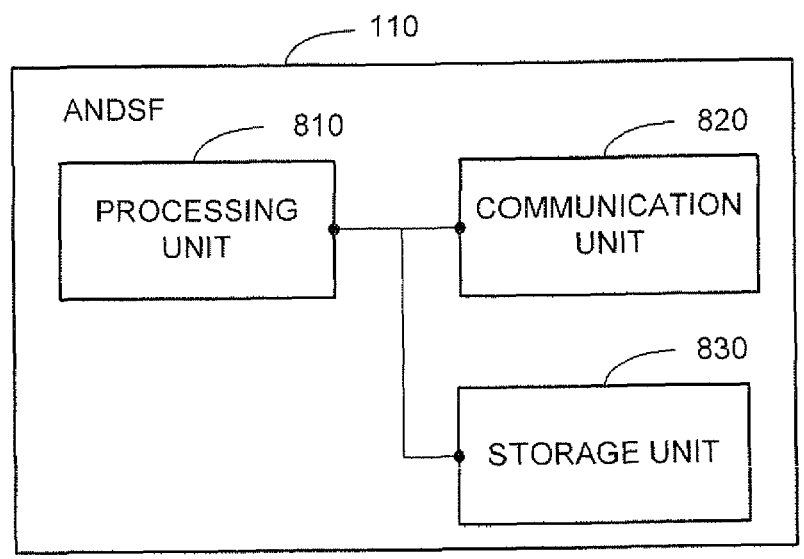
FIG. 8 illustrates a non-limiting example embodiment of an ANDSF.

Referring back to FIG. 3B, based on the neighbor relations data from the reporting terminals, the ANDSF builds the neighbor relations map in step S310 and provides the access information to the receiving terminals based on the map in step S320. FIG. 8 illustrates a non-limiting embodiment of an ANDSF, which includes among others, a processing unit 810, a communication unit 820, and a storage unit 830. The processing unit 810 is arranged to control other units to provide services associated with the ANDSF. The communication unit 820 is arranged to communicate with nodes outside of the ANDSF including with the wireless terminals over defined interfaces such as the S14 interface. The storage unit 830 is arranged to store information necessary for the ANDSF to function.

Figure 9:
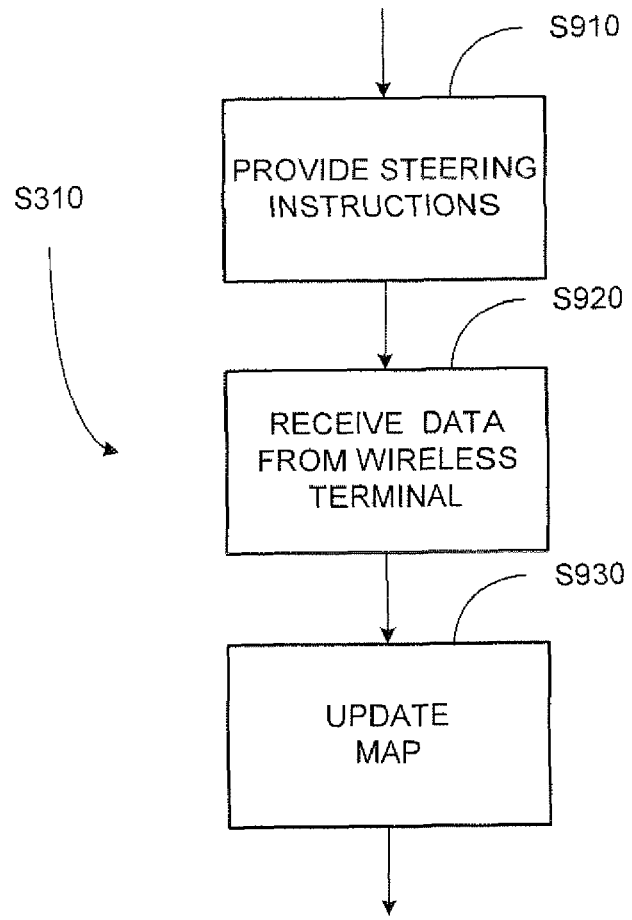
FIG. 9 illustrates a non-limiting example method the ANDSF performs to build the neighbor relations map based on neighbor relations data from the wireless terminals.

FIG. 9 illustrates an example non-limiting process which the ANDSF performs to implement step S310 of updating the neighbor relations map. The communication unit 820 provides steering instructions to the reporting terminals in step S910. In step S920, the communication unit 820 receives neighbor relations data from the reporting terminals. Based on the received data, the processing unit 810 updates the neighbor relations map in step S930. The map can be stored in the storage unit 830.

While not illustrated, the ANDSF can provide the steering instructions to the reporting terminals at any time, not just prior to step S920. Indeed, step S910 can occur independently of steps S920 and S930. Also, these steps can be performed continually.

As previously mentioned, one of many advantageous uses of the steering instructions is to enable the system as a whole to operate efficiently. Efficient operation in one regard is concerned with providing the ANDSF with quality neighbor relations data without overly consuming system resources, without straining system capabilities, and without draining the terminal batteries. In this regard, it is desirable to appropriately control the data recording/reporting behaviors of the reporting terminals to avoid:

Excessive signaling on communication interface between the reporting terminals and the ANDSF such as S14 interface in 3GPP, since signaling consumes communication resources including radio interface resources.
Excessive processing load in the ANDSF.
Excessive activation of idle reporting terminals for neighbor relationship reporting. Activation typically requires setting up a signaling connection (e.g. moving from idle mode to connected mode) to enable a reporting terminal to send the report to the ANDSF. This signal set up consumes resources.
Unnecessary wireless terminal battery consumption due to frequent and/or redundant reporting.

Figure 10:
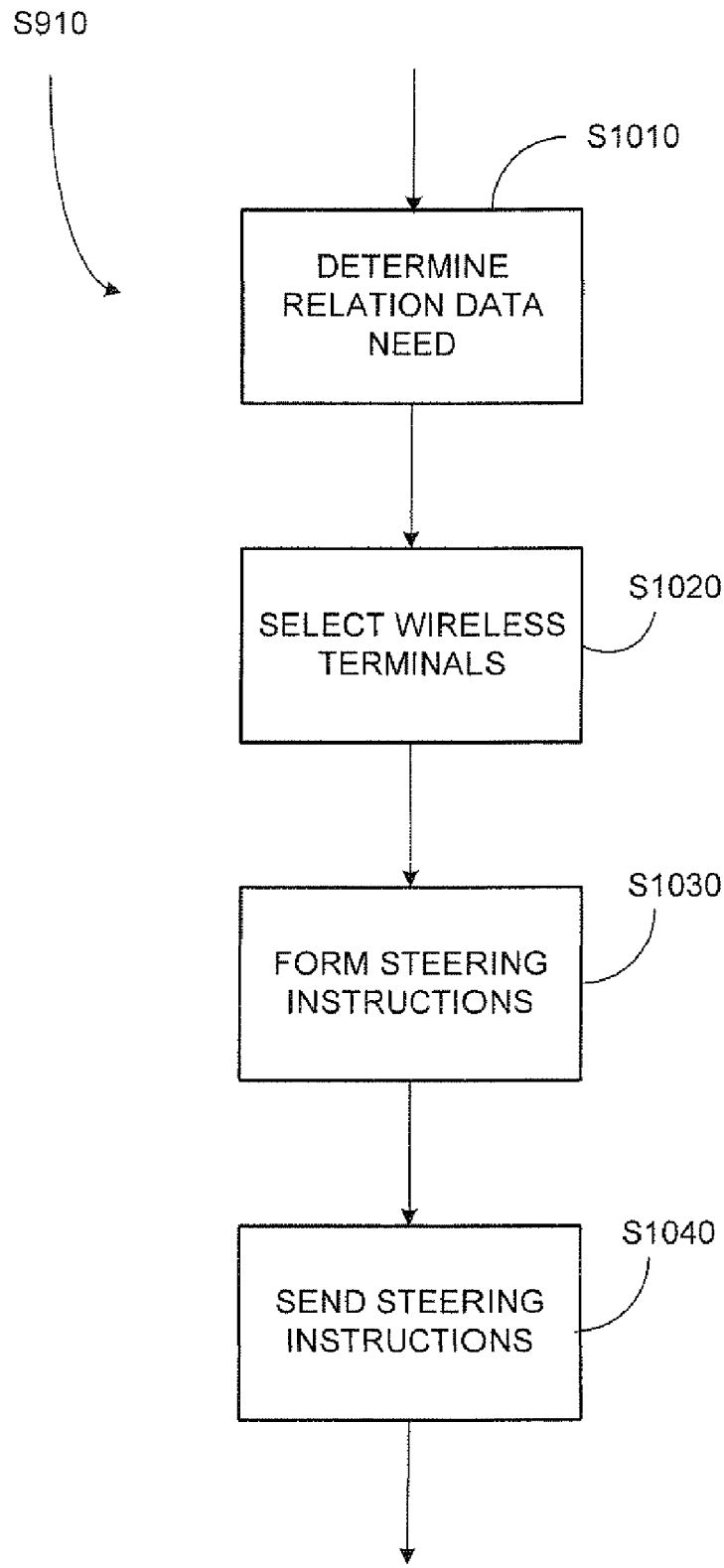
FIG. 10 illustrates a non-limiting example method the ANDSF performs to provide steering instructions to the wireless terminals.

ANDSF can tailor the steering instructions for each reporting terminal or can send the same instructions to a group of reporting terminals as needs arise and to avoid the above-noted and other pitfalls. FIG. 10 illustrates a non-limiting example method the ANDSF performs to implement step S910 of providing the steering instructions to the reporting terminals.

As illustrated, in step S1010, ANDSF's processing unit 810 analyzes the neighbor relations map to determine what, if any, neighbor relations data is needed or desired to update the map. That is, precision of the map is measured. In step S1020, ANDSF selects which of the available wireless terminals will participate in gathering the needed or desired data, i.e., selects the reporting terminals. In step S1030, the processing unit 810 forms the steering instructions for the selected reporting terminals, and in step S1040, the communication unit 820 sends the instructions to the reporting terminals.

Depending on the needs or wants determined in step S1010, the selection of reporting terminals in step S1020 and the content of steering instructions formed in step S1030 and sent in step S1040 are affected. Some examples are provided as follows:

ANDSF may determine that the map has old or insufficient neighbor relations data in a specific region. For example, time stamps used to indicate when neighbor relations data was last reported may indicate that no update occurred for more than a predetermined period of time. In this instance, ANDSF may form steering instructions for the reporting terminals to record and report neighbor relations data in that specific region. The steering instructions can also instruct the reporting terminals to prioritize reporting these data. Selected reporting terminals can be all or some of the available terminals.

ANDSF may determine that the map lacks data for a non-domain access network, e.g., network is newly deployed or a business arrangement is in place with the network. ANDSF can select wireless terminals with access capability matching the access technology of the network and form steering instructions for these reporting terminals. ANDSF can instruct the reporting terminals to prioritize reporting of these data over others in the steering instructions.

ANDSF may determine that the map lacks data for extra-domain neighbor relations. For instance, when a new access network within the domain is deployed, the neighbor relations map will lack extra-domain neighbor relations involving this new access network. ANDSF can instruct the reporting terminals to prioritize reporting of these extra-domain neighbor relations data over others in the steering instructions.

ANDSF may provide blacklist instructions to ignore certain access networks because access to those networks are not allowed (e.g., due to lack of roaming agreement) or to ignore certain access technologies (e.g., since they are not supported). Some or all wireless terminals can be selected.

ANDSF may instruct the reporting terminals to record and report neighbor relations data when it is registered at certain PLMN(s) (step S1030). This is useful to obtain neighbor relations data specifically for wireless terminals that are roaming in other networks. This allows a network to provide the receiving terminals with the access information from the home network, which is useful when the visited network does not support ANDSF functionality.

ANDSF may configure the reporting terminals with a minimum reporting interval. This allows the ANDSF to control signaling and processing load. If the reporting terminal has relevant data to report before this interval elapses, it keeps it for next batch to report. The reporting interval specifies a minimum durations to pass between reports. Optionally, instructions can specify that reporting interval applies only to reports that require contacting the ANDSF specifically for reporting purposes, but does not apply to opportunistic reporting. Alternatively, for some reporting terminals, minimum reporting interval could be statically fixed to limit reporting frequency below a predetermined level.

ANDSF may configure the reporting terminals with a minimum number of detected neighbor relations to be included in any report. This also allows control of signaling overhead associated with connection established to provide the report. This can be combined with a maximum time period of report suppression, after which the reporting terminal may report even if it has detected less than the minimum number of neighbor relations. Optionally the minimum number of detected neighbor relations can apply only to reports that would require contacting the ANDSF specifically for reporting, but would not apply to opportunistic reporting.

ANDSF may instruct the reporting terminals to report only during specified time periods, e.g. night-time, or other non-busy times. Also, during non-busy times, application of rules such as minimum reporting interval and minimum number of detected neighbor relations can be suspended.

ANDSF may instruct the reporting terminals to remember their most frequently detected (of the relatively recently detected) neighbor relations and suppress these neighbor relations in its reports. This minimizes redundant reporting from the wireless terminals. A leaky bucket algorithm can be used to maintain this list of neighbor relations to be suppressed.

ANDSF may select a subset of available wireless terminals as the reporting terminals, which it configures and instructs to record and report neighbor relations data. The subset can be a predetermined percentage, set number, or some other measure. ANDSF may select the subset according a predetermined algorithm or logic. As an example, a subscriber may allow his wireless terminal to be used for reporting in exchange for lower subscription fee or other benefits. The selection may be random as well. Preferably, the selected subset is changed periodically so that most or all wireless terminals are used as reporting terminals at some point. This spreads the burden among the terminals. Also, since most wireless terminals do not move all around, changing the subset so that most or all wireless terminals are used maximizes coverage.

ANDSF may provide the reporting terminals a "reporting probability value", which controls the terminal's probability to take part in the data recording/reporting (e.g. governing a (pseudo) random choice in the terminal whether or not to record and report a detected neighbor relation). ANDSF can provide the terminals with same reporting probability value or assign different values to different terminals. Since ANDSF controls these probability values, it can control the signaling/processing/measurement load. Fixed probability values can also be implemented to limit the load.

ANDSF may adapt steering instructions to each reporting terminal's capabilities such as access technology or positioning capabilities (step S1030). For example, if a new access network is being deployed, ANDSF may particularly instruct reporting terminals which support the access technology of new access network to report neighbor relations (or give them higher probability values). In another example, ANDSF may select (or give higher probability values to) the wireless terminals with GPS receivers. In yet another example, reporting terminals with fixed power supplies (e.g. in cars) could be selected (or given higher probability values).

As noted, the steering instructions control the data recording/reporting behavior of the reporting terminals so that the needed or desired relations data are provided, which in turn can be used to update the neighbor relations map in order to keep it accurate and comprehensive, which then enable the ANDSF to provide accurate access information to the receiving terminals (see FIG. 3B, step S320).

Figure 11:
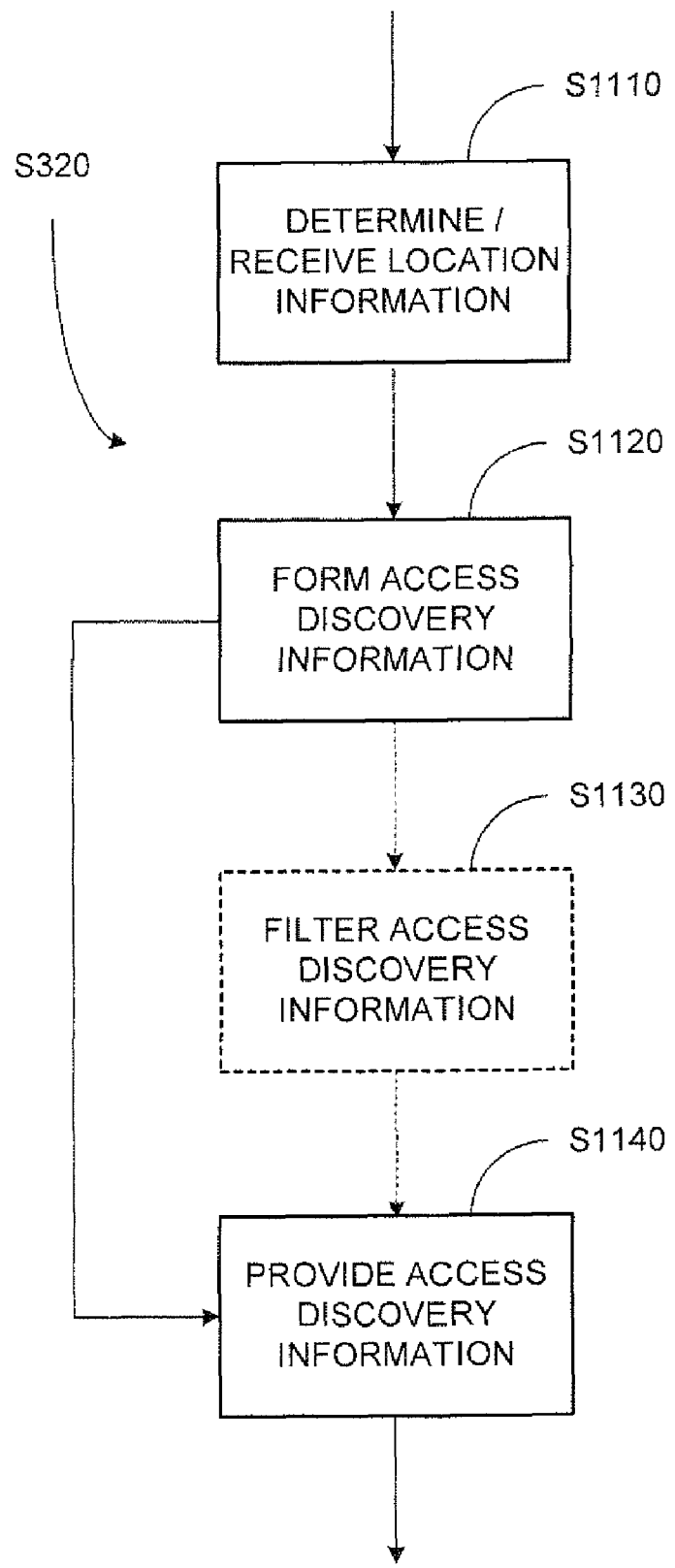
FIG. 11 illustrates a non-limiting example method the ANDSF performs to provide access information to the wireless terminals.

FIG. 11 illustrates a non-limiting example method the ANDSF performs to implement step S320. In step S1110, the processing unit 810 determines or the communication unit 820 receives location information related to a receiving terminal. This related location information can indicate actual location of the terminal or can be related to a cell currently providing radio access to the terminal. Information can include geographical coordinates, e.g., GPS coordinates, of the receiving terminal or of the cell. When referring to the cell, information can include cell's registration identity (LAC, LAI, RAC, RAI, TAC, TAI and so on) and/or its global cell identity, from which the ANDSF can translate into cell's geographical position. Location information can be reported by the receiving terminal or communication unit 620 can retrieve the information from consulting management parts of the system.

In step S1120, the processing unit 810 forms the access information from the neighbor relations map based on the location information. That is, the access information typically includes a list of extra- or non-domain neighboring cells, e.g., when the terminal is located in a domain access network, near the receiving terminal's location or a full or partial neighbor relations map for an area covering the receiving terminal's location. In addition to non-domain cells, the ANDSF may also include domain cells in the access information, e.g., when the terminal is located in a non-domain access network. In a non-limiting embodiment, the processing unit 810 monitors the receiving terminal's movement, e.g., through change in geographical position, change in cells providing radio access, etc. When it detects that receiving terminal has or will soon reach a border of an area covered by a previous access information, the processing unit 810 forms new access information.

Optionally, the processing unit 810 can filter the access information in step S1130. A non-exhaustive list of filtering criteria that can be applied include:

Exclude cells with access technologies not supported by the receiving terminal. That is, filtering of the access information can be based on multi-access capabilities of the wireless terminal.

Exclude cells which the receiving terminal is not authorized to access, e.g., due to policy reasons or subscription.

Exclude cells with "usefulness indicator" below a predetermined threshold level. In a non-limiting embodiment, the usefulness indicator reflects any combination of: how often neighbor relations involving the cell has been reported; manner of relations detection (through handovers, movements in idle mode, or measurements based on scanning) and how many times each of such detection event occurred; success or failures of handovers or movements in idle mode, etc. When success and failures of handovers and movements are considered, the "usefulness indicator" can also reflect a probability of success handover or movement in idle mode. To support this feature a wireless terminal may, in accordance with instructions from the ANDSF, report successes and failures of handovers, separately or in combination with reporting of the utilized neighbor relation. A wireless terminal may also supply additional information, such as the type of action, e.g. type of transition or scanning that triggered the detection of a reported neighbor relation.

Exclude cells whose relations information is older than a predetermined age threshold. In a non-limiting embodiment, ANDSF may mark each neighbor relation with a timestamp of when the neighbor relation was reported. This enables the ANDSF to determine how old the information is. Recall that the ANDSF can also use timestamps to steer the reporting terminals to update old neighbor relations.

Exclude cells whose distance from the position indicated in related terminal location information is greater than a predetermined threshold distance.

Not all filters need be applied. Any combination of filters, including none, can be applied. Also, filters other than those specifically listed can be applied.

In step S1140, the communication unit 820 provides the access information to the receiving terminal, e.g., over the defined communication interface. The communication unit 820 may transfer the access information to the receiving terminal:

Upon request from the receiving terminal;

When the receiving terminal's location indicates that transfer of the access information is appropriate (e.g. the receiving terminal's location is outside of an area that the previous access information was intended to cover), or periodically.

In a non-limiting embodiment, ANDSF can be extended to also receive neighbor relations data from and/or provide the access information to visiting wireless terminals. For example, referring back to FIG. 9, step S920 or both steps S910 and S920 can be augmented to provide recording/reporting steering instructions to and receive extra- or non-domain neighbor relations data from the visiting wireless terminals, including extra- or non-domain neighbors that non-visiting wireless terminals are not allowed access (e.g., due to lack of roaming agreement), which as a consequence they would not normally report on as well. Conversely, steps S1110, S1120, S1130, and S1140 can be augmented to provide the access information to the visiting wireless terminals including information on neighboring cells which non-visiting wireless terminals are not allowed access and thus consequently would not be included in their access information.

Figure 12:
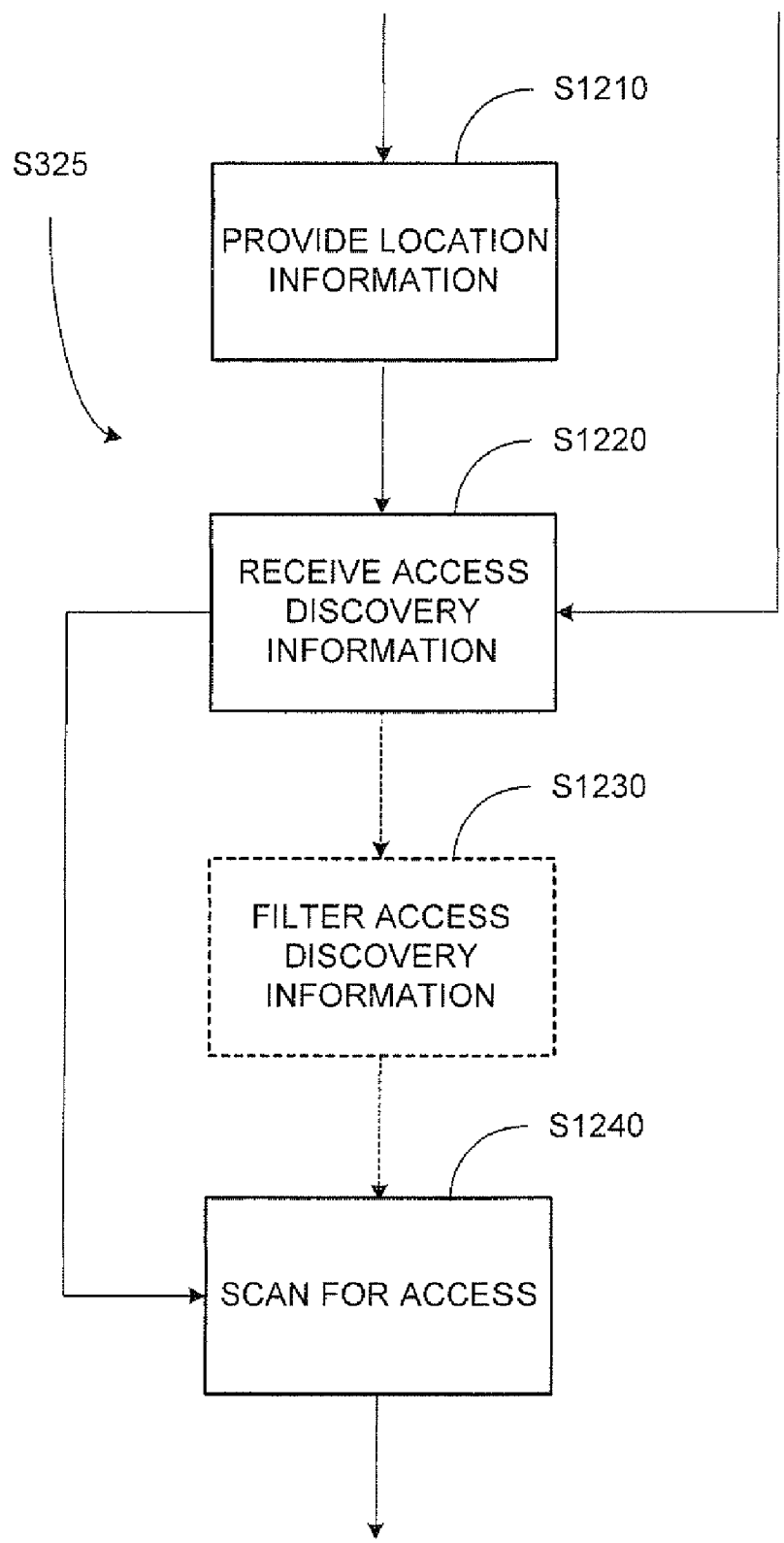
FIG. 12 illustrates a non-limiting example method the wireless terminal performs to receive and use the access information.

FIG. 12 illustrates a non-limiting example method a receiving terminal performs to implement step S325. In step S1210, the communication unit 620 provides location information related to the receiving terminal's current location to the ANDSF. The location information can be the terminal's actual location or related to a cell currently providing radio access. In one embodiment, the communication unit 620 makes a request to the ANDSF for access information and includes the location information in the request. Alternatively, the request itself initiates a process by which the location information is provided to the ANDSF, e.g., ANDSF retrieves the information.

In step S1220, the communication unit 620 receives the access information from the ANDSF. Note that the access information can be received without providing the location information in step S1210. As noted, ANDSF may provide the access information, for example, periodically or when determines that new access information is needed because the receiving terminal's current location is outside of an area that the previous access information was intended to cover. Note that the ANDSF may also receive/retrieve information about the location of the wireless terminal from a network node, e.g. a Mobility Management Entity (MME) in an SAE core network, a Home Subscriber Server (HSS), a Policy and Charging Rules Function (PCRF) or an Application Function (AF) server.

Optionally, the processing unit 610 can filter the access information in step S1230. One or more of the filtering criteria used by the ANDSF listed above with respect to step S1130 can also be used by the processing unit 610. For example, ANDSF may not have filtered the access information according to the usefulness indicator or may have used a very low filtering threshold. The processing unit 610 can apply its own threshold, which can be more stringent, for filtering. Also, the wireless terminal may include filtering criteria that the ANDSF does not include.

In step S1240, the communication unit 620 scans for access to one or more non-domain cells in the access information. If the received access information includes domain cells, e.g. if the wireless terminal is currently located in a non-domain access network, the wireless terminal may also scan for domain cells. In a non-limiting embodiment, the communication unit 620 scans only for accesses provided in the access information or only for accesses that remain after filtering if filtering took place.

But in some circumstances, the communication unit 620 may still scan for accesses outside of the access information. In one example, the communication unit 620 scans for other accesses because the processing unit 610 determines that the discovery information is insufficient, which can happen, e.g. when the ANDSF is initially populating the map and the receiving terminal is in a region for which the map lacks data.

In another example, the processing unit 610 decides that a handover must be performed, but the access information, even if sufficient, indicates that there are no useful cells or that cells are not reachable. In a non-limiting embodiment, the access information is deemed to be sufficient when it includes a number of possible access that is greater than a predetermined number.

There are numerous advantages to the disclosed technology. A non-exhaustive list of these advantages include:

Automated configuration of comprehensive, localized neighbor relations map which eliminates a potentially huge and expensive configuration task.

Wireless terminals are provided with accurate access information.

Intelligent steering of data reporting/recording behaviors mitigates costs related to signaling overhead, processing power and wireless terminal battery consumption.

Allows the ANDSF to modify data recording/reporting behavior to adapt to the ANDSF's needs, e.g. based on the comprehensiveness or freshness of the data in the neighbor relation map.

Allows the ANDSF to steer data recording/reporting behavior toward specific access technology(ies), which is useful e.g. during/after deployment of a new access network.

Allows the access information and the steering instructions to be tailored to the specific wireless terminals based on e.g., terminal location, terminal access technology capabilities, terminal's roaming status, etc.

Benefits multi-radio and single-radio terminals.

Can be beneficially be combined with the Forward Attach Function (FAF), which has been proposed for optimization of WiMAX-to-3GPP and 3GPP-to-WiMAX handovers.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public.

What is claimed is:

1. A method of operating an Access Network Discovery and Selection Function (ANDSF) apparatus within a domain of access technologies, the method comprising:
   automatically configuring a neighbor relations map based on neighbor relations data from one or more reporting terminals,
   wherein the neighbor relations data includes data on
      one or more non-domain cells each of which is a neighbor of another non-domain cell, and/or
      one or more non-domain cells each of which is a neighbor of a domain cell, and/or
      one or more domain cells each of which is a neighbor of a non-domain cell,
   wherein information maintained in the neighbor relations map include
      extra-domain neighbor relations each of which is a neighbor relation between a domain cell and its extra-domain neighbor and vice versa, and/or
      non-domain neighbor relations each of which is a neighbor relation between two non-domain neighbors, and
   wherein the step of automatically configuring the neighbor relations map comprises:
      providing steering instructions to the reporting terminals;
      receiving the neighbor relations data from the reporting terminals; and
      updating the neighbor relations map based on the neighbor relations data from the reporting terminals.

2. The method of claim 1, wherein the domain comprises a set of 3GPP access technologies.

3. The method of claim 1, wherein the step of providing the steering instructions to the reporting terminals comprises:
   determining update needs of the neighbor relations map;
   selecting the reporting terminals among available wireless terminals to gather the neighbor relations data for the update needs;
   forming the steering instructions for the reporting terminals based on the update needs; and
   sending the steering instructions to the reporting terminals.

4. The method of claim 3, wherein the step of determining the update needs of the neighbor relations map comprises any one or more of:
   determining whether or not neighbor relations information for a region is older than a predetermined age, determining whether or not there is insufficient neighbor relations data for an access network using an access technology outside the domain, and determining whether or not there is insufficient extra-domain neighbor relations data for an access network within the domain.

5. The method of claim 3, wherein the step of selecting the reporting terminals comprises any one or more of:

selecting the reporting terminals based on their access technology capabilities, selecting the reporting terminals based on their positioning capabilities, selecting the reporting terminals based on their power supply, selecting the reporting terminals based on their subscription, selecting a subset of available wireless terminals, the subset being less than all, and assigning the available wireless terminals with reporting probability values which control each terminal's probability of participating in the neighbor relations data recording and reporting.

6. The method of claim 5, wherein when the subset of available wireless terminals are selected, the subset is changed periodically such that substantially all wireless terminals participate in the neighbor relations data recording and reporting over a specified duration.

7. The method of claim 5, wherein when the reporting terminals are given reporting probability values, the reporting probability value of each reporting terminal is based on traits of the reporting terminal including any on or more of access technology capabilities, positioning capabilities, subscription, and power supply.

8. The method of claim 3, wherein the step of forming the steering instructions comprises any one or more of:

forming the steering instructions to prioritize the neighbor relations recording and reporting based on the update needs of the map, forming the steering instructions to record and report neighbor relations in a specific region, forming the steering instructions to record and report neighbor relations for an access network which uses an access technology outside the domain and for which there is insufficient neighbor relations information, forming the steering instructions to record and report extra-domain neighbor relations for an access network which uses an access technology within the domain and for which there is insufficient extra-domain neighbor relations information, forming the steering instructions to blacklist an access network or access technology, forming the steering instructions to record and report neighbor relations when roaming within a particular PLMN, forming the steering instructions to specify a minimum reporting interval which instructs the reporting terminals to wait at least for the minimum reporting interval to pass in between reportings, forming the steering instructions to specify a minimum number of detected neighbor relations which instructs the reporting terminals include at least the minimum number of neighbor relations when reporting, forming the steering instructions to instruct the reporting terminals to report only during one or more specified reporting time periods, and forming the steering instructions to suspend reporting of most frequently detected neighbor relations within a predetermined recent time period.

9. The method of claim 8, wherein the step of forming the steering instructions further comprises any one or more of:

forming the steering instructions to instruct that the minimum reporting interval does not apply to opportunistic reporting or during the specified reporting time periods, forming the steering instructions to instruct that the minimum number of detected neighbor relations does not apply to opportunistic reporting or during the specified reporting time periods, and forming the steering instructions to specify a maximum time suppression period to instruct the reporting terminals to report any detected neighbor relations even when the number of detected neighbor relations is less than the minimum number of detected neighbor relations when the maximum time suppression period since a previous report has elapsed.

10. The method of claim 1, wherein the data on each cell in the neighbor relations data includes at least an access technology and a global cell identity, the data on each cell further including zero or more of the following:

a physical cell identity, carrier frequency, carrier bandwidth, registration area identity, network identity, operator identity, cell specific configuration, success/failure of handover or movement in idle mode, and location.

11. The method of claim 1, further comprising providing access network discovery and selection information to one or more receiving terminals based on the neighbor relations map, wherein for each receiving terminal, the access network discovery and selection information is adapted to the receiving terminal's location, and the access network discovery and selection information includes a list of non-domain cells and/or domain cells within a vicinity of the receiving terminal.

12. The method of claim 11, wherein the access network discovery and selection information includes a list of non-domain cells when the receiving terminal is currently located in a domain access network, and the access network discovery and selection information includes a list of non-domain cells and/or domain cells when the receiving terminal is currently located in a non-domain access network.

13. The method of claim 11, wherein the step of providing the access network discovery and selection information to the receiving terminals comprises performing for each receiving terminal:

determining or receiving a location information related to the receiving terminal;

forming the access network discovery and selection information from the neighbor relations map based on the location information; and providing the access network discovery and selection information to the receiving terminal.

14. The method of claim 13, wherein the step of providing the access network discovery and selection information to the receiving terminals further comprises filtering the access network discovery and selection information prior to providing the access network discovery and selection information to each receiving terminal, wherein filtering criteria includes any one or more of:

exclude cells with access technologies not supported by the receiving terminal, exclude cells which the receiving terminal is not authorized to access, exclude cells with a "usefulness indicator" below a predetermined threshold level, the usefulness indicator indicating a probability of success of access, handover or movement in idle mode, exclude cells whose relations information is older than a predetermined age threshold, and exclude cells whose distance from a position indicated in the location information is greater than a predetermined threshold distance.

15. The method of claim 13, wherein step of forming the access network discovery and selection information comprises forming new access network discovery and selection information when the receiving terminal has reached a border of an area covered by previously provided access network discovery and selection information or is outside the area.

16. The method of claim 13, wherein the step of providing the access network discovery and selection information to the receiving terminal comprises providing the access network discovery and selection information according to any one or more of:

upon request from the receiving terminal, when the receiving terminal's location indicates that transfer of the access network discovery and selection information is appropriate, and periodically.

17. The method of claim 1, wherein at least one reporting terminal or at least one receiving terminal is a visiting wireless terminal.

18. The method of claim 1, wherein the neighbor relations data involves information of success and failure of handover or movement in idle mode.

19. An Access Network Discovery and Selection Function (ANDSF) apparatus within a domain of access technologies, the apparatus comprising:

a communication unit arranged to provide steering instructions to one or more reporting terminals and receive neighbor relations data from the reporting terminals; and a processing unit arranged to form the steering instructions and automatically configure a neighbor relations map based on the neighbor relations data from the reporting terminals, wherein the steering instructions specify neighbor relations data recording and reporting behaviors of the reporting terminals, wherein the neighbor relations data includes data on one or more non-domain cells each of which is a neighbor of another non-domain cell, and/or one or more non-domain cells each of which is a neighbor of a domain cell, and/or one or more domain cells each of which is a neighbor of a non-domain cell, wherein information maintained in the neighbor relations map include extra-domain neighbor relations each of which is a neighbor relation between a domain cell and its extra-domain neighbor and vice versa, and/or non-domain neighbor relations each of which is a neighbor relation between two non-domain neighbors, and wherein the processing unit forms the steering instructions by determining update needs of the neighbor relations map, selecting the reporting terminals among available wireless terminals to participate in gathering the neighbor relations data for the update needs, and forming the steering instructions for the reporting terminals based on the update needs.

20. The ANDSF apparatus of claim 19, wherein the domain comprises a set of 3GPP access technologies.

21. The ANDSF apparatus of claim 19, wherein the processing unit selects the reporting terminals from the available wireless terminals or assigns reporting probability values, which control each wireless terminal's probability of participating, to the available wireless terminals based on any one or more of terminal's access technology capabilities, positioning capabilities, power supply, and subscription, or selects a subset less than all available wireless terminals.

22. The ANDSF apparatus of claim 19, wherein the processing unit forms the steering instructions to instruct the reporting terminals to perform any one or more of:

prioritize the neighbor relations recording and reporting based on the update needs of the map, record and report neighbor relations in a specific region, record and report neighbor relations for an access network which uses an access technology outside the domain and for which there is insufficient neighbor relations information, record and report neighbor relations for an access network which uses an access technology within the domain and for which there is insufficient extra-domain neighbor relations information, blacklist an access network or access technology, record and report neighbor relations when roaming within a particular PLMN, wait at least for a minimum reporting interval to pass in between reportings, include at least a minimum number of neighbor relations when reporting, report any detected neighbor relations after a maximum report suppression period even when a number of detected neighbor relations is less than the minimum number of detected neighbor relations, report only during one or more specified reporting time periods, suspend reporting of most frequently detected neighbor relations within a predetermined recent time period, and use opportunistic reporting at any time.

23. The ANDSF apparatus of claim 19, wherein the data on each cell in the neighbor relations data includes at least an access technology and a global cell identity, the data on each cell further including zero or more of the following:

a physical cell identity, carrier frequency, carrier bandwidth, registration area identity, network identity, operator identity, cell specific configuration, usefulness indicator, success/failure probability of handover or movement in idle mode, and location.

24. The ANDSF apparatus of claim 19, wherein the processing unit forms access network discovery and selection information for one or more receiving terminals based on the neighbor relations map such that for each receiving terminal, the access network discovery and selection information is adapted to each receiving terminal's location and includes a list of non-domain cells and/or domain cells within a vicinity of each receiving terminal, and the communication unit provides the access network discovery and selection information to each receiving terminal upon request from the receiving terminal, when the receiving terminal's location indicates that transfer of the access network discovery and selection information is appropriate, and/or periodically.

25. The ANDSF apparatus of claim 24, wherein
the access network discovery and selection information includes a list of non-domain cells when the receiving terminal is currently located in a domain access network, and
the access network discovery and selection information includes a list of non-domain cells and/or domain cells when the receiving terminal is currently located in a non-domain access network.

26. The ANDSF apparatus of claim 24, wherein the processing unit filters the access network discovery and selection information before the communication unit provides the access network discovery and selection information to the receiving terminals in which filtering criteria includes any one or more of:
exclude cells with access technologies not supported by the receiving terminal,
exclude cells which the receiving terminal is not authorized to access,
exclude cells with a "usefulness indicator" below a predetermined threshold level, the usefulness indicator indicating a probability of success of access, handover or movement in idle mode,
exclude cells whose relations information is older than a predetermined age threshold, and
exclude cells whose distance from a position indicated in the location information is greater than a predetermined threshold distance.

27. The ANDSF apparatus of claim 24, wherein the processing unit forms new access network discovery and selection information when the receiving terminal has reached a border of an area covered by previously provided access network discovery and selection information or is outside the area.

28. The apparatus of claim 19, wherein at least one reporting terminal or at least one receiving terminal is a visiting wireless terminal.

29. The ANDSF apparatus of claim 19, wherein the neighbor relations data involves information of success and failure of handover or movement in idle mode.

30. A method of operating a wireless terminal, the method comprising:
reporting neighbor relations data to an Access Network Discovery and Selection Function (ANDSF) apparatus operating within a domain of access technologies based on steering instructions from the ANDSF apparatus,
wherein the steering instructions specifies neighbor relations data recording and reporting behavior of the wireless terminal, and
wherein the neighbor relations data includes data on
one or more non-domain cells each of which is a neighbor of another non-domain cell, and/or
one or more non-domain cells each of which is a neighbor of a domain cell, and/or
one or more domain cells each of which is a neighbor of a non-domain cell, and
wherein the neighbor relations data involves information of success and failure of handover or movement in idle mode.

31. The method of claim 30, wherein the step of reporting the neighbor relations data to the ANDSF apparatus comprises:
receiving the steering instructions from the ANDSF apparatus;
collecting the neighbor relations data by one or both of:
performing any one of an extra-domain handover, an extra-domain cell reselection, a non-domain handover, and a non-domain cell reselection; and
scanning a surrounding of the wireless terminal;
recording the collected neighbor relations data consistent with the steering instructions; and
reporting the recorded neighbor relations data to the ANDSF apparatus consistent with the steering instructions, wherein
the data on each cell in the neighbor relations data includes at least an access technology and a global cell identity, the data on each cell further including zero or more of the following: a physical cell identity, carrier frequency, carrier bandwidth, registration area identity, network identity, operator identity, cell specific configuration, and location.

32. The method of claim 31, wherein the step of reporting the recorded neighbor relations data comprises any one or more of:
specifically contacting ANDSF for the purpose of reporting the neighbor relations data;
opportunistically reporting the neighbor relations data; and
responding to a poll from the ANDSF.

33. The method of claim 31, wherein the steering instructions provide instructions to the wireless terminal to perform any one or more of:
prioritize the neighbor relations data recording and reporting based on any one more of a region, access technology, and access network,
record and report neighbor relations in a specific region,
record and report neighbor relations for a particular access network or access technology,
blacklist an access network or access technology,
record and report neighbor relations when roaming within a particular PLMN,
wait at least for a minimum reporting interval to pass in between reportings,
include at least a minimum number of neighbor relations when reporting,
report any detected neighbor relations after a maximum report suppression period even when a number of detected neighbor relations is less than the minimum number of detected neighbor relations,
report only during one or more specified reporting time periods,
suspend reporting of most frequently detected neighbor relations within a predetermined recent time period, and
use opportunistic reporting at any time.

34. The method of claim 30, wherein when the steering instructions are not in effect, the wireless terminal collects, records, and reports the neighbor relations data according to preconfigured default principles.

35. The method of claim 30, further comprising:
providing location information related to a current location of the wireless terminal;
receiving access network discovery and selection information from the ANDSF apparatus; and
scanning for non-domain cells and/or domain cells based on the received access network discovery and selection information.

36. The method of claim 35, further comprising filtering the access network discovery and selection information prior to scanning, wherein filtering criteria includes any one or more of:

exclude from scanning cells in the access network discovery and selection information whose access technology is not supported by the wireless terminal, exclude from scanning cells in the access network discovery and selection information which the wireless terminal is not authorized to access, exclude from scanning cells in the access network discovery and selection information with a "usefulness indicator" below a predetermined threshold level, the usefulness indicator indicating a probability of success of access, handover or movement in idle mode, exclude from scanning cells in the access network discovery and selection information whose relations information is older than a predetermined age threshold, and exclude from scanning cells in the access network discovery and selection information located greater than a predetermined threshold distance from the wireless terminal.

37. The method of claim 35, wherein the step of scanning for non-domain cells comprises scanning for non-domain cells and/or domain cells which are not in the access network discovery and selection information when it is determined that the access network discovery and selection information is insufficient, or when it is determined that the access network discovery and selection information indicates that there are no useful or reachable neighboring cells and the wireless terminal must perform a handover.

38. A wireless terminal, comprising:
a communication unit arranged to
receive steering instructions from an Access Network Discovery and Selection Function (ANDSF) apparatus operating within a domain of access technologies, the steering instructions specifying neighbor relations data recording and reporting behavior of the wireless terminal, collect the neighbor relations data through performing an inter-access transition or scanning a surrounding of the wireless terminal, where inter-access transition is a handover or movement in idle mode between a cell in the domain and a cell not in the domain or a handover or movement in idle mode between two cells not in the domain, and report the neighbor relations data to the ANDSF apparatus consistent with the steering instructions, and a processing unit arranged to record the collected neighbor relations data into a storage unit consistent with the steering instructions prior to being reported by the communication unit, wherein the neighbor relations data includes data on
one or more non-domain cells each of which is a neighbor of another non-domain cell, and/or
one or more non-domain cells each of which is a neighbor of a domain cell, and/or
one or more domain cells each of which is a neighbor of a non-domain cell, wherein the neighbor relations data involves information of success and failure of handover or movement in idle mode, and wherein the data on each cell in the neighbor relations data includes at least an access technology and a global cell identity, the data on each cell further including zero or more of the following: a physical cell identity, carrier frequency, carrier bandwidth, registration area identity, network identity, operator identity, cell specific configuration, and location.

39. The wireless terminal of claim 38, wherein the communication unit receives access network discovery and selection information from the ANDSF apparatus and scans for non-domain cells and/or domain cells based on the received access network discovery and selection information.

40. The wireless terminal of claim 39, wherein the communication unit scans for non-domain cells and/or domain cells that are not in the access network discovery and selection information when the processing unit determines that the access network discovery and selection information is insufficient, or when the processing unit determines that the access network discovery and selection information indicates that there are no useful or reachable neighboring cells and the wireless terminal must perform a handover.

* * * * *

UNITED STATES PATENT AND TRADEMARK OFFICE
CERTIFICATE OF CORRECTION

Page 1 of 2

PATENT NO. : 8,391,238 B2
APPLICATION NO. : 12/403933
DATED : March 5, 2013
INVENTOR(S) : Rune et al.

It is certified that error appears in the above-identified patent and that said Letters Patent is hereby corrected as shown below:

On the Title Page, in Item (75), under "Inventors", in Column 1, Line 1, delete "Lidingo" and insert -- Lidingö --, therefor.

On the Title Page, in Item (73), under "Assignee", in Column 1, Line 2, delete "(pulb)," and insert -- (publ), --, therefor.

In the Drawings:

In Fig. 6, Sheet 8 of 13, delete "  " and insert --  --, therefor.

In the Specifications:

In Column 3, Line 10, delete "DESCRIPTION" and insert -- BRIEF DESCRIPTION --, therefor.

In Column 3, Line 31, delete "5C" and insert -- 3C --, therefor.

In Column 3, Line 42, delete "terminal; and" and insert -- terminal; --, therefor.

In Column 4, Line 36, delete "RAM)," and insert -- "RAM"), --, therefor.

In Column 5, Line 22, delete "US" and insert -- UE --, therefor.

Signed and Sealed this
Sixteenth Day of July, 2013

Teresa Stanek Rea
*Acting Director of the United States Patent and Trademark Office*

CERTIFICATE OF CORRECTION (continued)
U.S. Pat. No. 8,391,238 B2

In Column 6, Line 62, delete ""↔". Thus, a1 "↔". b3 and a2 "↔". c4" and insert -- "↔". Thus, a1↔b3 and a2↔c4 --, therefor.

In Column 6, Line 63, delete " $b3 \leftrightarrow c4$ " and insert -- $b3 \leftrightarrow c4$ --, therefor.

In Column 10, Line 49, delete "4B);" and insert -- 4B): --, therefor.

In Column 10, Line 53, delete "e.g," and insert -- e.g., --, therefor.

In Column 11, Line 20, delete "principles" and insert -- principles. --, therefor.

In Column 11, Line 61, delete "(MME" and insert -- (MME) --, therefor.

In the Claims:

In Column 21, Line 32, in Claim 7, delete "on or more" and insert -- one or more --, therefor.

In Column 25, Line 37, in Claim 28, delete "apparatus" and insert -- ANDSF apparatus --, therefor.